(12) United States Patent
Shyam et al.

(10) Patent No.: US 8,984,097 B1
(45) Date of Patent: Mar. 17, 2015

(54) EFFICIENT FILE REPLICATION WHICH PRESERVES THE UNDERLYING EXTENT STRUCTURE

(75) Inventors: Nagaraj Shyam, Cupertino, CA (US); Bala Kumaresan, Cupertino, CA (US); Brad Boyer, San Jose, CA (US); Ashish Puri, Santa Clara, CA (US)

(73) Assignee: Symantec Corporation, Mountain View, CA (US)

( * ) Notice: Subject to any disclaimer, the term of this patent is extended or adjusted under 35 U.S.C. 154(b) by 124 days.

(21) Appl. No.: 13/478,309

(22) Filed: May 23, 2012

(51) Int. Cl.
*G06F 15/16* (2006.01)

(52) U.S. Cl.
USPC .......... 709/218; 709/227; 709/217; 707/610; 707/640

(58) Field of Classification Search
None
See application file for complete search history.

(56) References Cited

U.S. PATENT DOCUMENTS

| | | | |
|---|---|---|---|
| 4,467,421 A | 8/1984 | White | |
| 5,247,638 A | 9/1993 | O'Brien | |
| 5,996,022 A | 11/1999 | Krueger | |
| RE36,989 E | 12/2000 | White | |
| 6,308,222 B1 | 10/2001 | Krueger | |
| 6,496,868 B2 | 12/2002 | Krueger | |
| 6,976,026 B1 | 12/2005 | Getzinger | |
| 7,099,514 B2 | 8/2006 | Getzinger | |
| 7,558,801 B2 | 7/2009 | Getzinger | |
| 8,140,603 B2 | 3/2012 | Getzinger | |
| 8,370,404 B2 | 2/2013 | Getzinger | |
| 2001/0014123 A1 | 8/2001 | Strasman | |
| 2005/0147310 A1 | 7/2005 | Getzinger | |
| 2005/0226514 A1 | 10/2005 | Getzinger | |
| 2006/0242182 A1 | 10/2006 | Palaniappan | |
| 2006/0271601 A1 * | 11/2006 | Fatula et al. | 707/201 |
| 2008/0162523 A1 * | 7/2008 | Kraus et al. | 707/101 |
| 2008/0243860 A1 * | 10/2008 | Cannon et al. | 707/10 |
| 2009/0238475 A1 | 9/2009 | Getzinger | |
| 2011/0119228 A1 | 5/2011 | Menze | |
| 2012/0047115 A1 | 2/2012 | Subramanya et al. | |
| 2012/0134600 A1 | 5/2012 | Getzinger | |
| 2012/0271868 A1 * | 10/2012 | Fukatani et al. | 707/822 |
| 2013/0159645 A1 * | 6/2013 | Anglin et al. | 711/162 |

* cited by examiner

*Primary Examiner* — Ario Etienne
*Assistant Examiner* — Clayton R Williams
(74) *Attorney, Agent, or Firm* — Meyertons, Hood, Kivlin, Kowert & Goetzel, P.C.

(57) ABSTRACT

A system and method for replicating a set of files from a source computer system to a target computer system are described. The underlying extent structure of the files may be preserved. For example, if an original file on the source computer system has a particular number of extents then the copy of the file created on the target computer system may have the same number of extents, where each respective extent in the copy represents the same byte range of the file as its corresponding extent in the original file. The file systems employed on the source computer system and the target computer system may support different extent types. The extent types of the original files stored on the source computer system may be preserved in the copies of the files on the target computer system.

19 Claims, 30 Drawing Sheets

Information transmitted for extent 215A of file 210A

- Extent type = Normal
- Byte range = 0-44
- Data length
- Data: 001 001 110 111 001 100 110
  011 101 010 111 000 000 100
  011

Information transmitted for extent 215B of file 210A

- Extent type = Compressed
- Byte range = 45-71
- Data length
- Data: 111 101 010 011 000 111

Information transmitted for extent 215C of file 210A

- Extent type = Normal
- Byte range = 72-116
- Data length
- Data: 001 000 011 111 100 011 100
  111 110 000 000 001 100 000
  001

Information transmitted for extent 215D of file 210A

- Extent type = Shared
- Byte range = 117-146
- Data length
- Data: 101 111 110 001 011 111 111
  110 011 010

FIG. 17

Information transmitted for extent 215F of file 210C

- Extent type = Compressed
- Byte range = 0-44
- Data length
- Data:       100 110 101 000 101 011 111
              001 001 100 011

Information transmitted for extent 215G of file 210C

- Extent type = Hole
- Byte range = 45-65
- Data: (None transmitted)

Information transmitted for extent 215H of file 210C

- Extent type = Normal
- Byte range = 66-89
- Data length
- Data:       001 100 011 111 111 100 010
              100

Information transmitted for extent 215J of file 210C

- Extent type = ZFOD
- Byte range = 90-146
- Data: (None transmitted)

FIG. 21

EFFICIENT FILE REPLICATION WHICH PRESERVES THE UNDERLYING EXTENT STRUCTURE

BACKGROUND OF THE INVENTION

1. Field of the Invention

This invention relates generally to the field of computer systems, and more particularly, to a system and method for replicating a set of files that preserves the underlying extent structure and achieves various efficiencies based on the extent types of the extents.

2. Description of the Related Art

Many computer systems execute file system software that operates to store files on a storage device. From the point of view of most software applications, the data for a file has a logical structure as a continuous stream of bytes, e.g., starting at offset 0 and continuing to offset N−1, where N is the size of the file in bytes. However, the data may or may not all be stored on the underlying storage device as a continuous set of bytes.

In an extent-based file system, the data of each file is organized into one or more extents. An extent is information that represents a particular byte range of a file. An extent may correspond to a contiguous set of storage device locations, e.g., a contiguous set of disk blocks in the case where the storage device is a disk drive. Suppose for example that a file has two extents. One portion of the file's data that corresponds to one of the extents may be stored in one contiguous set of disk blocks, and another portion of the file's data that corresponds to the other extent may be stored in another contiguous set of disk blocks. The two sets of disk blocks may be located anywhere on the disk drive.

The underlying extent structure of a file is usually transparent to most software applications. A typical software application may read the data from a file through an interface provided by the file system software which presents a view of the file data as a continuous stream of bytes, as described above. For example, the application may open the file and request to read the data at particular logical offsets within the file. The file system generally takes care of determining how the logical offsets map to the underlying extents and determining where the data of each extent is stored on the underlying storage device.

In some computer networks, files need to be replicated periodically from a source computer system to a target computer system. A software application may execute on the source computer system to read the file data and transmit it to the target computer system. The target computer system may receive the file data and create copies of the files. The software application that reads the file data on the source computer system may not be aware of the underlying extent structure of the files. For example, the software application may read the file data through the normal file system interface which provides the file data but does not provide any information indicating how the data is organized into extents. The software application may transmit the file data to the target computer system without transmitting any information specifically indicating how the data is organized into extents. Thus, while the files may be copied to the target computer system, the underlying extent structure of the files may not be preserved on the target computer system. For example, if a particular file on the source computer system has four different extents, the copy of the file created on the target computer system may have a different number of extents, e.g., may have only one extent, or may have six extents. Or even if the copy that is created does happen to have four extents, the extents in the copy may represent different byte ranges than the byte ranges represented by the extents in the original file.

SUMMARY

Various embodiments of a system and method for replicating one or more files from a source computer system to a target computer system are described. According to one embodiment of the system and method, the source computer system may receive extent information identifying extents of a file. The source computer system may determine from the extent information that the file includes a first extent of a first extent type. The first extent type may be one of a plurality of extent types. The source computer system may determine first transmission information corresponding to the first extent to transmit to the target computer system. The first transmission information may be based on the first extent type and may specify the first extent type. The source computer system may transmit the first transmission information to the target computer system. The first transmission information may enable the target computer system to replicate the first extent.

In some embodiments the source computer system may also determine from the extent information that the file includes one or more additional extents. Each additional extent may have an extent type that is one of the plurality of extent types. For each respective additional extent, the source computer system may determine the extent type of the respective additional extent, and may determine respective transmission information corresponding to the respective additional extent to transmit to the target computer system. The respective transmission information may be based on the extent type of the respective additional extent and may specify the extent type. The source computer system may transmit the respective transmission information to the target computer system. The respective transmission information may enable the target computer system to replicate the respective additional extent.

In further embodiments the target computer system may receive the first transmission information corresponding to the first extent from the source computer system. The target computer system may analyze the first transmission information to determine that the first transmission information specifies the first extent type. The target computer system may send a file system of the target computer system a request to create the first extent in the copy of the file. The request to create the first extent may specify the first extent type.

The file may have a plurality of original extents. Each extent may be an extent of one of the plurality of extent types. The target computer system may create a respective new extent corresponding to each original extent. The respective new extent may be an extent of the same extent type as the original extent to which the respective new extent corresponds.

In some embodiments the first extent may specify that a particular set of data corresponds to a first byte range of the file. The program instructions may be executable to cause the source computer system to replicate the file to the target computer system without transmitting the particular set of data to the target computer system.

In some embodiments the first extent may correspond to a first byte range of the file and correspond to a first set of storage locations of a storage device. The first set of storage locations may be allocated to the file. The source computer system may replicate the file to the target computer system without reading data from the first set of storage locations.

In some embodiments the first extent may correspond to a first byte range of the file and correspond to a first set of storage locations of a storage device. The first set of storage locations may be allocated to the file. The first extent type may indicate that when an application requests to read the first byte range of the file, a file system should return all 0's as data for the first byte range. The source computer system may replicate the file to the target computer system without transmitting 0's as data for the first byte range.

In some embodiments the first extent may correspond to a first byte range of the file for which storage device locations are not allocated. The first extent type may indicate that when an application requests to read the first byte range of the file, a file system should return all 0's as data for the first byte range. The source computer system may replicate the file to the target computer system without transmitting 0's as data for the first byte range.

In some embodiments the first extent may correspond to a first byte range of the file and correspond to a first set of storage locations of a storage device. Encoded data may be stored in the first set of storage locations. The first extent type may indicate that when an application requests to read the first byte range of the file, a file system should decode the data and return the decoded data. The source computer system may transmit the encoded data to the target computer system without decoding the data.

In some embodiments the file may be a first file, and the first extent type may indicate that the first extent references data that is shared with a second extent of a second file (or a second extent of the same first file). The first extent and the second extent may correspond to a first set of storage locations of a storage device. First data may be stored in the first set of storage locations. In replicating the file to the target computer system, the source computer system may read the first data from the first set of storage locations and transmit the first data to the target computer system in the first transmission information. The source computer system may replicate the second file to the target computer system without re-transmitting the first data to the target computer system.

BRIEF DESCRIPTION OF THE DRAWINGS

A better understanding can be obtained when the following detailed description is considered in conjunction with the following drawings, in which:

FIG. 17 shows the transmission information for the extents of the first file which may be sent to the target computer system;

FIG. 21 shows the transmission information for the extents of the third file which may be sent to the target computer system;

Figure 1:
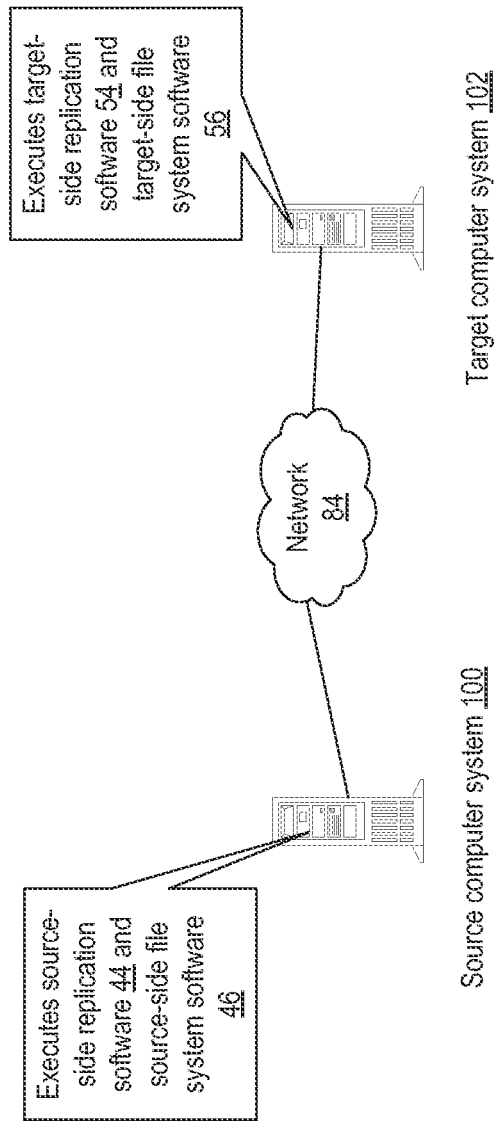
FIG. 1 illustrates one embodiment of a system for replicating files from a source computer system to a target computer system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Various embodiments of a system and method for replicating a set of files from a source computer system to a target computer system are described herein. The system and method may operate to preserve the underlying extent structure of the files. For example, if an original file on the source computer system has a particular number of extents then the copy of the file created on the target computer system may have the same number of extents, where each respective extent in the copy represents the same byte range of the file as its corresponding extent in the original file.

In some embodiments the file systems employed on the source computer system and the target computer system may support different extent types. The extent types of the original files stored on the source computer system may be preserved in the copies of the files on the target computer system. For example, if a given extent in an original file on the source computer system is an extent of a particular type then the corresponding extent created in the copy of the file on the target computer system may be of the same type. Examples of extent types are discussed below, and a description of how preserving the extent types may enable the system and method to achieve various kinds of efficiencies in replicating the files is also given below.

FIG. 1 illustrates an example of the system according to one embodiment. The system may include a source computer system 100 coupled via a network 84 to a target computer system 102. The source computer system 100 may execute source-side file system software 46 that creates and manages files on a storage device coupled to the source computer system. The source computer system 100 may also execute source-side replication software 44. In some embodiments the source-side replication software 44 may be a software application which operates on the source computer system in user mode, e.g., as opposed to kernel mode.

The source-side replication software 44 may communicate with the source-side file system software 46 to read data associated with the files and transmit information to the target-side replication software 54 executing on the target computer system 102 to enable the target-side replication software 54 to create copies of the files on the target computer system. Unlike conventional replication applications that replicate the file data while remaining unaware of the underlying extent structure of the files, the source-side replication software 44 may be configured to retrieve extent information indicating the extents of the files. Based on the extent information, the source-side replication software 44 may determine transmission information corresponding to each extent to be transmitted to the target computer system. The target-side replication software 54 may receive the transmission information corresponding to each extent and request the target-side file system software 56 to create the extent in a copy of the file on the target-side storage device.

The normal interface provided by a conventional file system may not enable a user-mode application to retrieve file extent information. The source-side file system software 46 may provide an enhanced interface that enables the source-side replication software 44 to retrieve the file extent information. For example, the source-side file system software 46 may implement particular input/output controls (ioctl's) or other routines that the source-side replication software 44 can invoke to retrieve the extent information and to perform other operations to achieve efficiency in replicating certain types of extents, as described below.

Similarly, the target-side file system software 56 may also provide an enhanced interface that enables the target-side replication software 54 to request that extents of particular types be created when creating the copies of the files. The target-side file system software 56 may implement particular ioctl's or other routines that the target-side replication software 54 can invoke to specify the properties of each extent to be created.

The network 84 coupling the source computer system 100 to the target computer system 102 may include any type of network or combination of networks. For example, the network 84 may include any type or combination of local area network (LAN), a wide area network (WAN), wireless networks, an Intranet, the Internet, etc. Examples of local area networks include Ethernet networks, Fiber Distributed Data Interface (FDDI) networks, and token ring networks. The computer systems may each be coupled to the network(s) using any type of wired or wireless connection medium. For example, wired mediums may include Ethernet, fiber channel, a modem connected to plain old telephone service (POTS), etc. Wireless connection mediums may include a wireless connection using a wireless communication protocol such as IEEE 802.11 (wireless Ethernet), a modem link through a cellular service, a satellite link, etc.

In various embodiments the source computer system 100 may need to replicate the files onto the target computer system 102 to implement any of various kinds of applications. As one example, the files may be replicated onto the target computer system 102 as a backup measure so that backup copies are available in case the original files are lost or corrupted on the source computer system.

As another example, the source computer system 100 and the target computer system 102 may be used for content distribution, e.g., where end users can access the content of the files. For example, it may be desirable to replicate files onto multiple nodes at different points in a network so that users located in different geographic regions can access the content of the files on whichever node is nearest to them. Although the present description generally refers to replicating a set of files from one source computer system to one target computer systems, embodiments of the methods described herein can me employed to replicate a set of files onto multiple target computer systems, where the underlying extent structure of the files is preserved on each target computer system.

Figure 2:
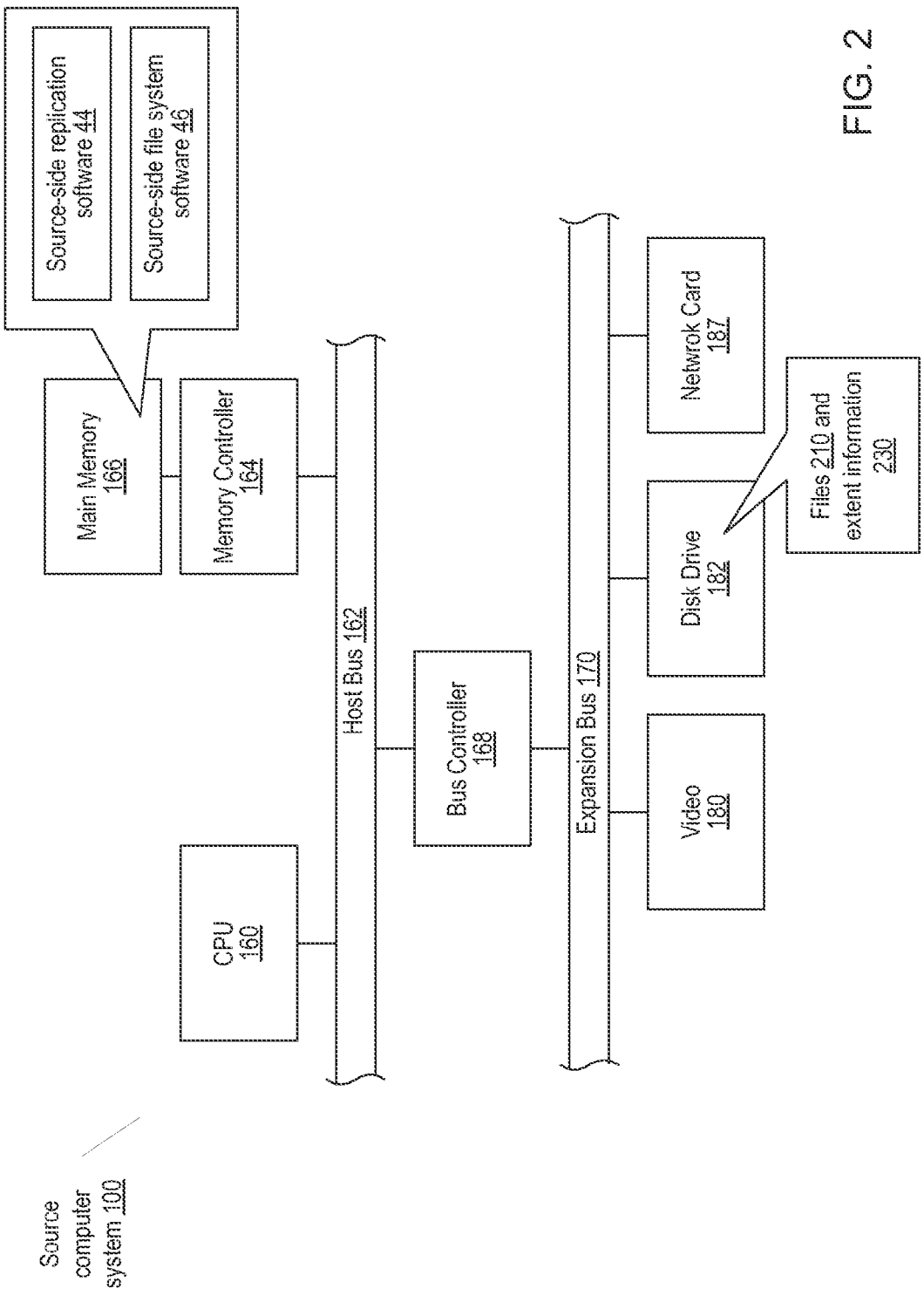
FIG. 2 illustrates features of the source computer system according to some embodiments.

Referring now to FIG. 2, an example of the source computer system 100 according to one embodiment is illustrated in greater detail. In general, the source computer system 100 may include any kind of computer system(s), such as one or more personal computer systems (PC), workstations, network appliances, distributed computer systems, or other computing devices or combinations of devices. In general, the term "computer system" is broadly defined to encompass any device (or combination of devices) having at least one processor that executes instructions from one or more storage mediums. FIG. 2 illustrates a representative PC embodiment. Elements of a computer not necessary to understand the present description have been omitted for simplicity.

The source computer system 100 may include at least one central processing unit or CPU (processor) 160 which may be coupled to a processor or host bus 162. The processor 160 may be any of various types. For example, in some embodiments, the processor 160 may be compatible with the x86 architecture, while in other embodiments the processor 160 may be compatible with the SPARC™ family of processors. Also, in some embodiments the source computer system 100 may include multiple processors 160.

The source computer system 100 may also include memory 166 in which program instructions implementing the source-side replication software 44 and the source-side file system software 46 are stored. In some embodiments the memory 166 may include one or more forms of random access memory (RAM) such as dynamic RAM (DRAM) or synchronous DRAM (SDRAM). In other embodiments, the memory 166 may include any other type of memory configured to store program instructions. The memory 166 may also store operating system software or other software used to control the operation of the source computer system 100. The memory controller 164 may be configured to control the memory 166.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. Various devices may be coupled to the expansion or input/output bus 170, such as a video display subsystem 180 which sends video signals to a display device, and a network card or device 187 that enables the source computer system 100 to send and receive information over a network.

In the example of FIG. 2, a disk drive 182 is also coupled to the expansion or input/output bus 170. The disk drive 182 may store the files 210 which are to be replicated onto the target computer system 102, e.g., may store the data of the files 210 as well as file system meta-data associated with the files 210. In particular, the file system meta-data may include extent information 230 indicating the extents of the files 210.

In other embodiments the files 210 may be stored across multiple disk drives, or may be stored on another kind of storage device other than a disk drive. Examples of other kinds of storage devices include solid state drives, optical drives, tape drives, etc. The storage device(s) on which the files 210 are stored may be included in or coupled to the source computer system 100 in any of various ways, e.g., via an input/output bus, via a network, via a wireless connection, etc.

Figure 3:
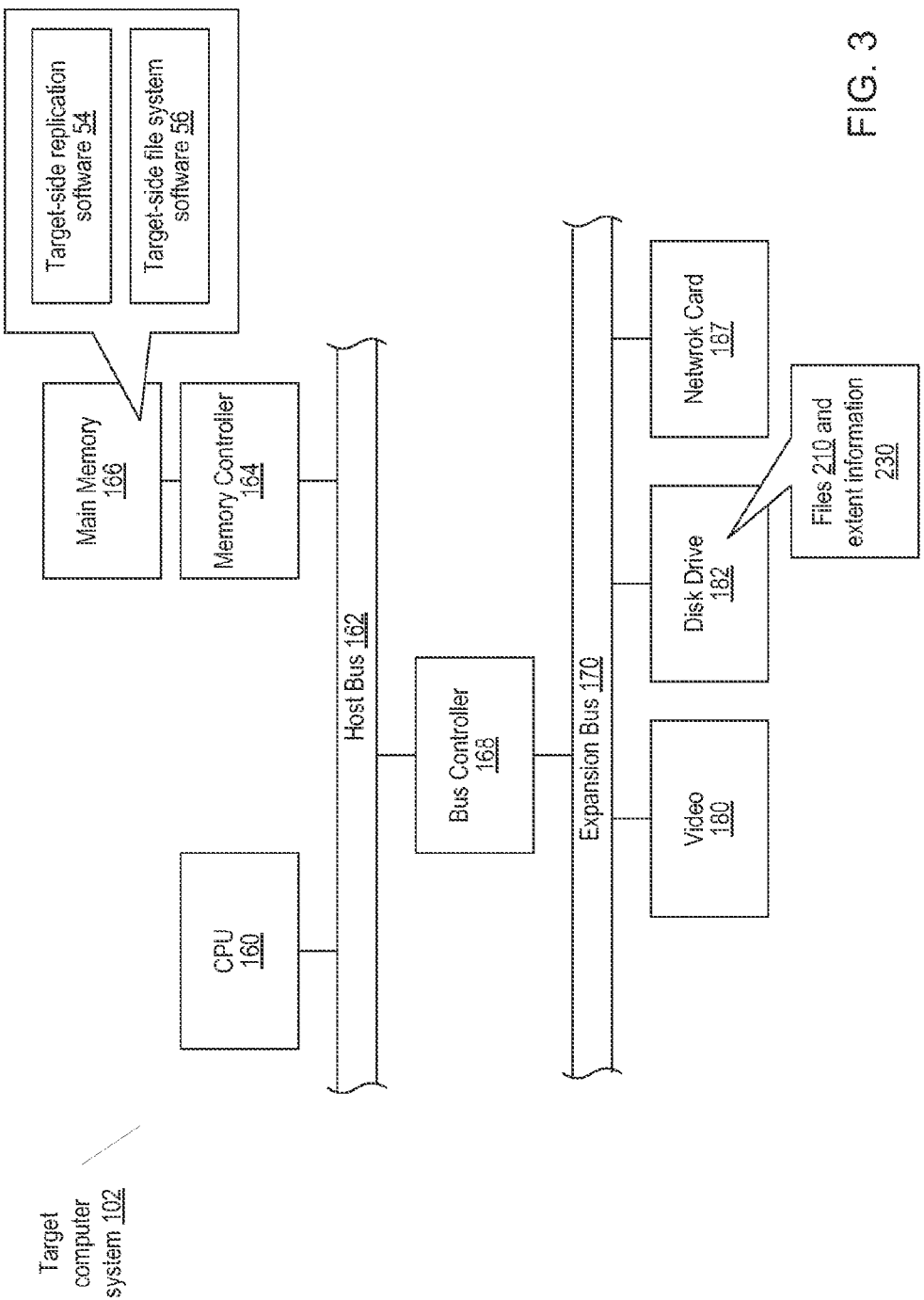
FIG. 3 illustrates features of the target computer system according to some embodiments.

FIG. 3 illustrates an example of the target computer system 102. In general, the target computer system 102 may include any kind of computer system(s). The target computer system 102 of FIG. 3 is similar to the source computer system 100 of FIG. 2, but instead of executing the source-side replication software 44 and the source-side file system software 46, the target computer system 102 is configured to execute the target-side replication software 54 and the target-side file system software 56. The target-side replication software 54 may operate in conjunction with the target-side file system software 56 to store copies of the files 210 on the disk drive 182, e.g., to store the data of the files 210 as well as file system meta-data associated with the files 210. In particular, the file system meta-data may include extent information 230 indicating that the copies of the files have extents that match the extents of the original files on the source computer system.

The source-side file system software 46 and the target-side file system software 56 may implement or support a plurality of extent types, e.g., where the extent types classify extents for different files into a fixed set of categories. In general, the file system software may implement any set of extent types, where each extent type is a classification that categorizes extents of different files together according to one or more common properties shared by these extents. Each extent of each file may be an extent of one of the supported extent types. Extents of different types have one or more properties distinct from extents of the other extent type(s).

Figure 4:
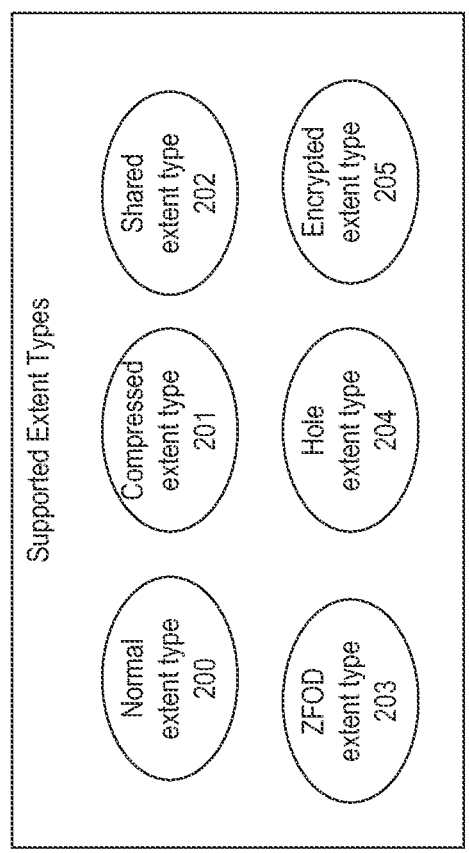
FIG. 4 illustrates a set of extent types that may be supported by the source-side file system software and the target-side file system software in some embodiments.

FIG. 4 illustrates a set of extent types that may be supported by the source-side file system software 46 and the target-side file system software 56 in some embodiments. The set of extent types includes a normal extent type 200. An extent of the normal extent type 200 may represent a particular byte range of a single file and may correspond to a contiguous set of storage device locations (e.g., disk blocks) allocated to the file for storing data associated with that byte range. The file data corresponding to the particular byte range may be stored by the file system software in the contiguous set of storage device locations in the same form in which the data was received by the application, e.g., without modifying or encoding the data. (The application may have encoded the data in some way before passing it to the file system and requesting the data to be written, but the file system software may not perform any further encoding or modification of the data.) When the file system software creates an extent of the normal extent type 200, in addition to allocating the contiguous set of disk blocks and storing the file data in its raw form in the allocated disk blocks, the file system software may also store extent information (meta-data) for the extent specifying information such as the extent type (e.g., normal), the byte range or offset to which the extent corresponds in the file, the starting disk block number of the extent data, and the length of the extent data.

The set of extent types in FIG. 4 also includes a compressed extent type 201. An extent of the compressed extent type 201 may represent a particular byte range of a single file and may correspond to a contiguous set of disk blocks (or other storage device locations if another kind of storage device is used) allocated to the file for storing compressed data associated with that byte range. For example, the file system software may receive from an application an original set of data associated with the byte range, and may then encode or compress the original data using a compression algorithm to produce the compressed data. The compressed data may be shorter in length than the original data. For example, if the original data is 20 MB in length then the compressed data may be 12 MB. Thus, the number of contiguous disk blocks allocated for the extent may be fewer than the number of disk blocks that would be needed if the original data were stored in its uncompressed form. This may help to save storage space on the disk drive. When the file system software creates an extent of the compressed extent type 201, in addition to allocating the contiguous set of disk blocks and storing the file data in its compressed form in the allocated disk blocks, the file system software may also store extent information (meta-data) for the extent specifying information such as the extent type (e.g., compressed), the byte range or offset to which the extent corresponds in the file, the starting disk block number of the extent data, and the length of the extent data.

The set of extent types in FIG. 4 also includes a shared extent type 202. An extent of the shared extent type 202 may correspond to data that is shared by multiple files or by different byte ranges within a single file. The file system software may allocate a contiguous set of disk blocks and store a single instance of the shared data in the disk blocks. For each byte range in each file that shares the data, the file system software may create a corresponding extent of the shared extent type 202, and may store extent information indicating that each of these extents corresponds to the same set of disk blocks. The use of shared extents may help to save storage space on the disk drive.

The set of extent types in FIG. 4 also includes a zero fill on demand (ZFOD) extent type 203. An extent of the ZFOD extent type 203 may represent a particular byte range of a single file and may correspond to a contiguous set of disk blocks allocated to the file for that byte range. However, the file system may not actually store any data in the allocated disk blocks. If an application requests to read the file data from the byte range represented by a ZFOD extent, the file system software may return 0's as the data for the byte range without reading any data from the disk blocks allocated for the byte range. It may be useful to create an extent of the ZFOD extent type 203, for example, to reserve disk space for files used by database applications or critical applications so that the disk space will be available later to store file data without potentially encountering an out-of-space error. When the file system software creates an extent of the ZFOD extent type 203, in addition to allocating the contiguous set of disk blocks for the extent, the file system software may also store extent information (meta-data) for the extent specifying information such as the extent type (e.g., ZFOD), the file byte range or offset to which the extent corresponds, the starting disk block of the set of allocated blocks, and the length of the allocated space.

The file system software may not receive any data for the byte range of the file to which the ZFOD extent corresponds when the ZFOD extent is initially created, e.g., since the application that uses the file may not yet have defined any data for this byte range. If the application later requests the file system to write data into this byte range then the file system may convert the extent into another type of extent, e.g., a normal extent, and write the data into the disk blocks that were allocated when the ZFOD extent was created. The file system may pad 0's into some of the disk blocks if data for only a portion of the byte range is specified. The file system may also split the ZFOD extent into two or more extents in some embodiments. For example, if a large number of disk blocks for a large byte range are initially allocated for the ZFOD extent and the application later requests to write a small amount of data somewhere in the middle of the byte range then the file system may split the ZFOD extent into three extents: a ZFOD extent representing the first part of the byte range; a normal extent representing the middle part of the byte range where the data was written; and another ZFOD extent representing the last part of the byte range. The file system may use any of various heuristics to determine whether to convert a ZFOD into a normal extent when data is written into it or to split the ZFOD extent into multiple extents, e.g., depending on the size of the original ZFOD extent and the amount of data written into it.

The set of extent types in FIG. 4 also includes a hole extent type 204. An extent of the hole extent type 204 may represent a particular byte range of a single file, but may not correspond to any disk blocks on the disk drive. A file that has one or more hole extents is also referred to as a sparse file. Similarly as in the case of a ZFOD extent, the file system software may not receive any data for the byte range of the file to which the hole extent corresponds when the hole extent is initially created, e.g., since the application that uses the file may not yet have defined any data for this byte range. Unlike a ZFOD extent however, the file system software may not allocate any disk blocks for the hole extent when the hole extent is created. When the hole extent is created, the file system software may store extent information (meta-data) for the extent specifying information such as the extent type (e.g., hole) and the byte range of the file to which the extent corresponds, but without referring to any particular disk blocks on the disk drive (since none have yet been allocated). If an application later requests the file system to write data into the byte range represented by the hole extent then the file system may convert the hole extent into another type of extent, e.g., a normal extent, allocate disk blocks for the new extent, and write the data into the disk blocks. Similarly as in the case of a ZFOD extent, the file system software may also split the hole extent into multiple extents in some embodiments. If an application requests to read the file data from the byte range represented by a hole extent before any data has been written there, the file system software may return 0's as the data without reading any data from the storage device (since no data for the byte range has been specified or written).

The set of extent types in FIG. 4 also includes an encrypted extent type 205. An extent of the encrypted extent type 205 may represent a particular byte range of a single file and may correspond to a contiguous set of disk blocks allocated to the file for storing encrypted data associated with that byte range. For example, the file system software may receive from an application an original set of data associated with the byte range, and may then encrypt the original data using an encryption algorithm to produce the encrypted data. The encrypted data may be shorter or longer in length than the original data. Thus, the number of contiguous disk blocks allocated for the extent may be fewer or larger than the number of disk blocks that would be needed if the original data were stored in its unencrypted form. When the file system software creates an extent of the encrypted extent type 205, in addition to allocating the contiguous set of disk blocks and storing the file data in its encrypted form in the allocated disk blocks, the file system software may also store extent information (meta-data) for the extent specifying information such as the extent type (e.g., encrypted), the file byte range or offset to which the extent corresponds, the starting disk block of the extent data, and the length of the extent.

FIG. 4 illustrates one example of a set of extent types, and in other embodiments the file system software may implement any other set of extent types. In replicating a set of files, the replication software may be configured to analyze the extent types of the extents in the files, and may replicate different types of extents differently depending upon their respective types, e.g., by using a different replication technique for each respective extent type in order to achieve various efficiencies in replicating the files based on the extent types. Examples of other types of extents that may be implemented by the file system software include compound extent types based on various combinations of other extent types, e.g., based on two or more of the extent types shown in FIG. 4. For example, one compound extent type could be a compressed and encrypted extent type which indicates that the data referenced by an extent is both compressed and encrypted. Another compound extent type could be a compressed and shared extent type which indicates that the data referenced by an extent is both compressed and shared with one or more other extents. Other compound types could arise when an indirect extent including multiple direct extents could get shared. For example, some of the direct extents might have backing disk blocks allocated for them, and others could be hole extents without any backing disk blocks. Thus, the hole extents could be shared due to the sharing of the indirect extent in which they are included.

Figure 5:
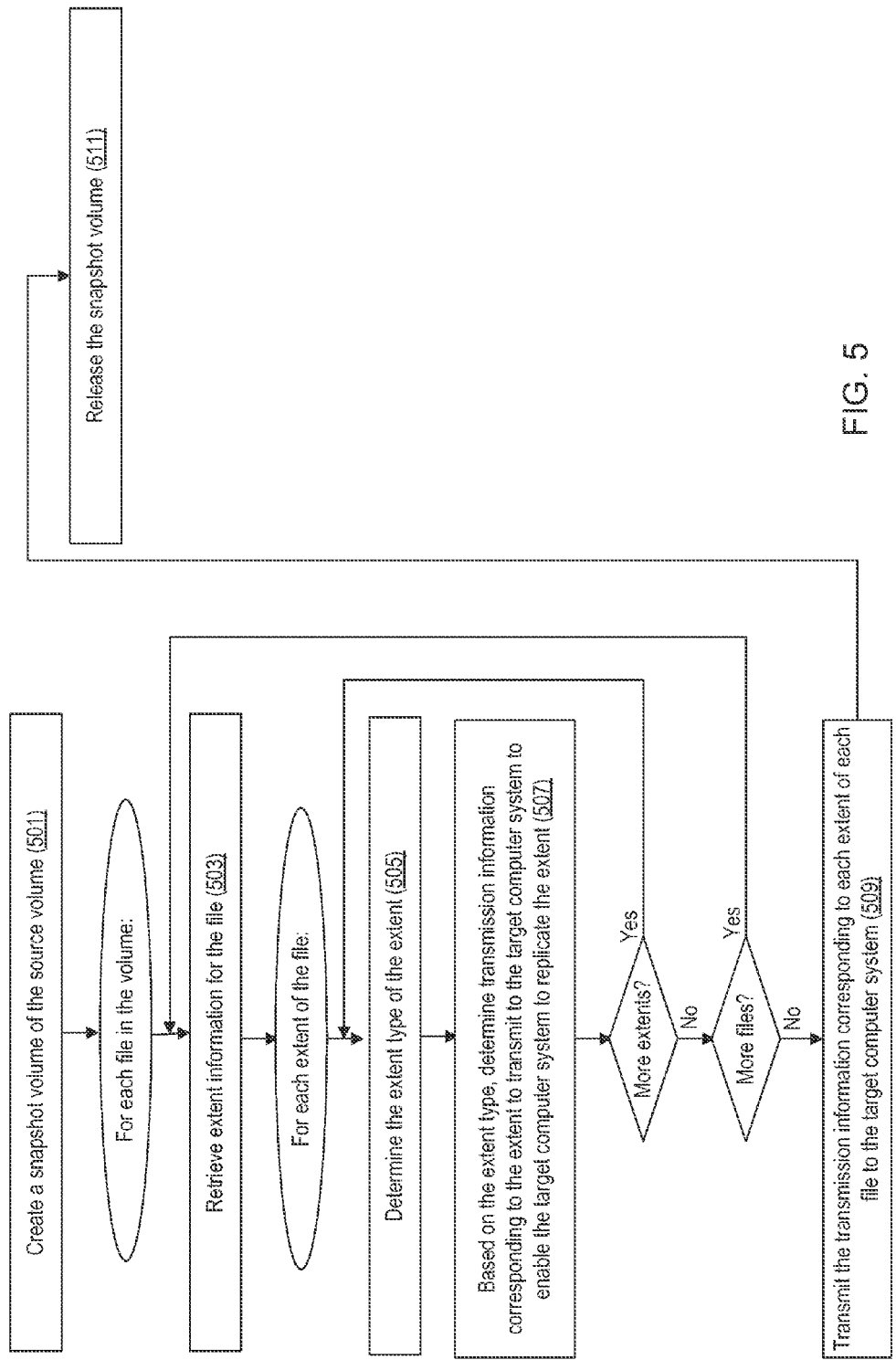
FIG. 5 is a flowchart diagram illustrating one embodiment of a method that may be performed by the source computer system to replicate a set of files to the target computer system.

FIG. 5 is a flowchart diagram illustrating one embodiment of a method that may be performed by the source computer system to replicate a set of files to the target computer system. The method may be implemented by the source-side replication software 44 executing in conjunction with the source-side file system software 46 on the source computer system. In the illustrated embodiment, an initial replication of an entire storage volume maintained by the source-side file system software 46 is performed, e.g., where none of the files have yet been stored on the target computer system. However, it is not necessary to replicate an entire storage volume, and in other embodiments the method may be employed to perform an initial replication of any set of two or more files.

As indicated in block 501, the source-side replication software 44 may first create a snapshot volume of the original source storage volume, e.g., using a copy-on-write (COW)

snapshot technique or other conventional snapshot technique. Data may be read from the snapshot volume instead of the original source volume throughout the replication method to ensure that the data is consistent since the original source volume may still be in use while the replication is being done, and thus may be modified while the replication is being done.

As indicated in block 503, for each file in the snapshot volume, the source-side replication software 44 may retrieve the extent information for the file (the meta-data describing the extents of the file) from the snapshot volume. The source-side replication software 44 may interface with the source-side file system software 46 through a special interface that enables the source-side replication software 44 to retrieve the extent information, e.g., by calling an ioctl or other routine provided by the source-side file system software 46.

As indicated in block 505, for each extent of the file, the source-side replication software 44 may determine the extent type of the extent. As indicated in block 507, the source-side replication software 44 may then determine transmission information corresponding to the extent to transmit to the target computer system. The transmission information corresponding to the extent may enable the target computer system to replicate the extent in the copy of the file that will be created on the target computer system. The transmission information for the extent may be based on the extent type. In other words, the source-side replication software 44 may determine the transmission information differently for extents of different extent types, as described below.

As indicated in block 509, the source-side replication software 44 may transmit the transmission information corresponding to each extent of each file to the target computer system. The transmission information for each extent may be transmitted to the target computer system in one or more messages. The transmission information for each extent may be transmitted separately from the transmission information for the other extents, or the transmission information for multiple extents may be transmitted together.

After the transmission information for each extent has been determined, the source-side replication software 44 may release the snapshot volume, as indicated in block 511.

Figure 6:
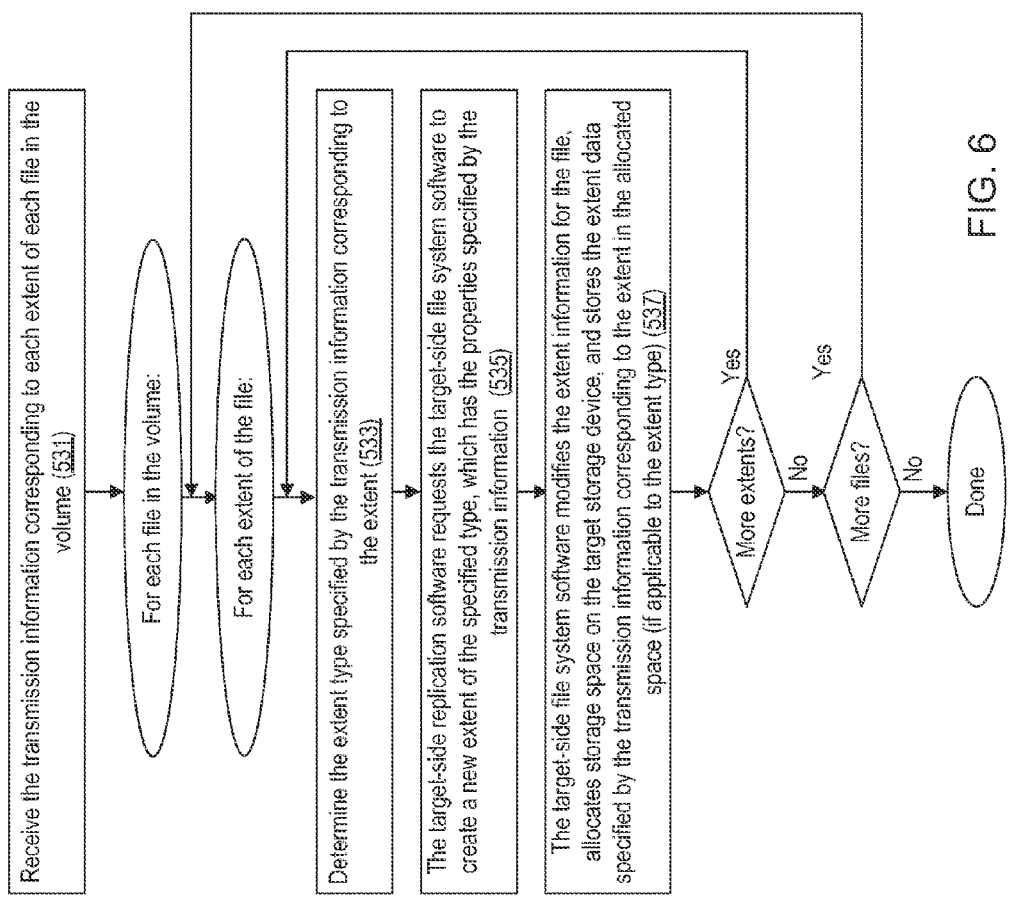
FIG. 6 is a flowchart diagram illustrating one embodiment of a method that may be performed by the target computer system to create the copies of the files in response to receiving the transmission information from the source computer system.

FIG. 6 is a flowchart diagram illustrating one embodiment of a method that may be performed by the target computer system to create the copies of the files in the volume in response to receiving the transmission information which is transmitted by the source computer system as discussed above with reference to the flowchart of FIG. 5. The method may be implemented by the target-side replication software 54 executing in conjunction with the target-side file system software 56 on the target computer system.

As indicated in block 531, the target-side replication software 54 may receive the respective transmission information corresponding to each extent of each file in the volume. For each extent of each file, the target-side replication software 54 may analyze the transmission information corresponding to the extent to determine the extent type specified by the transmission information. As indicated in block 533, the target-side replication software may request the target-side file system software to create a new extent of the specified type, which has the properties specified by the transmission information. For example, the target-side file system software 56 may provide a special programming interface which the target-side replication software 54 can invoke to request particular types of extents to be created. In response to the request, the target-side file system software 56 may modify the extent information for the file to create the extent. Depending on the extent type, the target-side file system software 56 may also allocate storage space (e.g., a set of contiguous disk blocks) on the target storage device. Again depending on the extent type, the target-side file system software 56 may also store data associated with the file byte range represented by the extent in the allocated storage space.

Thus, after the respective transmission information corresponding to each extent of each file in the volume has been processed, the target computer system may have a complete replica of the volume which not only replicates the primary file data, but also replicates the underlying extent structure of the files.

The processing that is performed on the source computer system side and the target computer system side in some embodiments during the initial replication is now described in more detail with respect to the particular extent types shown in FIG. 4.

If an extent is of the compressed extent type 201, the source-side replication software 44 may determine the transmission information for the extent as follows. The source-side replication software 44 may request the source-side file system software 46 to return the compressed data stored in the disk blocks associated with the extent. The source-side file system software 46 may provide an interface that enables the source-side replication software 44 to request the data in its compressed form, e.g., by invoking a special ioctl or other function or routine. Thus, the source-side file system software 46 may read the compressed data and return the compressed data to the source-side replication software 44 without uncompressing it. The transmission information sent by the source-side replication software 44 to the target-side replication software 54 may include the compressed data and properties of the extent, such as the extent type (e.g., compressed), the pathname of the file to which the extent belongs, the byte range of the file which the extent represents, the length of the extent (e.g, the number of bytes in the compressed data). As discussed above, the length of the compressed data may be smaller than the length of the byte range in the file which the extent represents, e.g., due to compression of the original data specified for the byte range. Thus, for example, the transmission information may specify that the extent represents the byte range from the logical offsets 4000 to 9500 of the file (a length of 5501 bytes), and may specify that the length of the extent is 3000 bytes (e.g., if the original 5501 bytes of data is compressed to 3000 bytes of compressed data).

In response to receiving the transmission information for the compressed extent, the target-side replication software 54 may analyze the transmission information to determine that the extent type is the compressed extent type 201. The target-side replication software 54 may also analyze the transmission information to determine the properties of the compressed extent (e.g., file pathname, the corresponding byte range in the file, the length of the compressed data). The target-side replication software 54 may then request the target-side file system software 56 to create the compressed extent in the copy of the file on the target computer system, e.g., by invoking one or more ioctl's or other routines provided by the target-side file system software 56 for this purpose. In making the request, the target-side replication software 54 may pass to the target-side file system software 56 the compressed data received in the transmission information, along with the properties of the compressed extent (e.g., file pathname, the corresponding byte range in the file, the length of the compressed data). The target-side file system software 56 may modify the extent information or other file system meta-data to create data structures corresponding to the extent, as well as allocating a set of disk blocks and storing the compressed data in the allocated disk blocks.

This treatment of a compressed extent during the volume replication may differ in several ways from conventional replication applications. First, some conventional file systems may not even support compressed extent types. Second, even if a file in the source volume does have a compressed extent, the file system may not provide an interface that the conventional source-side replication software can call to get the compressed data for the extent (or if such an interface does exist, the conventional source-side replication software may not use it). For example, the file system may only provide a conventional interface which allows the conventional source-side replication software to read the data for a particular byte range of the file. If the specified byte range corresponds to a compressed extent then the file system may read the compressed data, uncompress it, and return the uncompressed data to the conventional source-side replication software. From the point of view of the conventional source-side replication software, the decompression of the compressed data which is performed by the file system software may take place behind the scenes so to speak, e.g., so that the conventional source-side replication software may not even be aware that the data for that byte range was ever compressed. The conventional source-side replication software may thus receive the uncompressed data and transmit it to the target computer system rather than transmitting the compressed data to the target computer system. The target computer system may not receive any information from the source computer system indicating that the data was associated with a compressed extent, and may write the data to the target storage device in its uncompressed form.

The processing of a compressed extent type as described above in embodiments of the present system and method may achieve efficiencies on both the source computer system side and the target computer system side. For example, since the source-side replication software 44 requests the extent data in its compressed form, the source computer system does not have to expend computing resources to uncompress the data. Also, since the source-side replication software 44 transmits the compressed data rather than the uncompressed data to the target computer system, the amount of data which needs to be transmitted for the byte range of the file which the compressed extent represents may be reduced, thus saving computing resources and network bandwidth. On the target side, the amount of data that needs to be written may be reduced, thus saving both processing time and storage space.

The source-side replication software 44 may determine the transmission information for extents of the encrypted extent type 205 similarly as in the case of the compressed extent 201, but the transmission information for the extent would include encrypted data in this case rather than compressed data.

If an extent is of the ZFOD extent type 203, then the transmission information sent by the source-side replication software 44 for that extent may only be a small amount of information which specifies properties of the extent such as the extent type (e.g., ZFOD), the pathname of the file to which the extent belongs, the byte range of the file which the extent represents, and the length of the extent (e.g, the number of disk blocks to allocate for the extent). Thus, for example, the extent may represent a large byte range in the file, e.g., 10 MB, but the transmission information which is sent to the target computer system to enable the target computer system to create the extent may only be a few bytes of information. (Since the ZFOD extent type inherently indicates that the data for the file byte range which the ZFOD extent represents should be treated as all 0's, it is sufficient to simply communicate to the target computer system that the extent is a ZFOD extent without actually transmitting the 0's.)

In response to receiving the transmission information for the ZFOD extent, the target-side replication software 54 may analyze the transmission information to determine that the extent type is the ZFOD extent type 203. The target-side replication software 54 may also analyze the transmission information to determine the properties of the ZFOD extent (e.g., file pathname, the corresponding byte range in the file, the number of disk blocks to allocate for the extent). The target-side replication software 54 may then request the target-side file system software 56 to create the ZFOD extent in the copy of the file on the target computer system. In making the request, the target-side replication software 54 may pass to the target-side file system software 56 the properties of the ZFOD extent (e.g., file pathname, the corresponding byte range in the file, the number of disk blocks to allocate for the extent). The target-side file system software 56 may modify the extent information or other file system meta-data to create data structures corresponding to the extent, as well as allocating the specified number of disk blocks for the extent. However, it is not necessary for the target-side file system software 56 to actually write any data into the allocated disk blocks since the target-side file system software 56 can determine the extent type and return all 0's if an application requests to read data from the file byte range which the ZFOD extent represents.

This treatment of a ZFOD extent during the volume replication may differ in several ways from conventional replication applications. First, some conventional file systems may not even support ZFOD extent types. Second, even if a file in the source volume does have a ZFOD extent, the conventional source-side replication software may not be aware of this. The conventional source-side replication software may call a conventional read interface to read the data for the byte range represented by the ZFOD extent. Thus, for example, if the ZFOD extent represents a byte range which is 10 MB long, the file system software may return 10 MB of 0's as the data. The conventional source-side replication software may then transmit all of this data to the target computer system. The target computer system may not receive any information from the source computer system indicating that the data was associated with a ZFOD extent, and may write all the 0's to the target storage device.

Thus, the processing of a ZFOD extent type as described above in embodiments of the present system and method may achieve efficiencies on both the source computer system side and the target computer system side, e.g., by reducing the amount of data transmitted to the target computer system and reducing the amount of data written by the target computer system and the amount of space used on the target storage device.

If an extent is of the hole extent type 204, then the transmission information sent by the source-side replication software 44 for that extent may again be only a small amount of information which specifies properties of the extent such as the extent type (e.g., hole), the pathname of the file to which the extent belongs, and the byte range of the file which the extent represents. The target computer system may receive the transmission information and modify the extent information or other file system meta-data to create data structures corresponding to the extent. No disk blocks may be allocated for the hole extent. Again, this may achieve various efficiencies on both the source computer system side and the target computer system side as compared to conventional replication applications that are unaware of the underlying extent structure of the files they are replicating.

Figure 7:
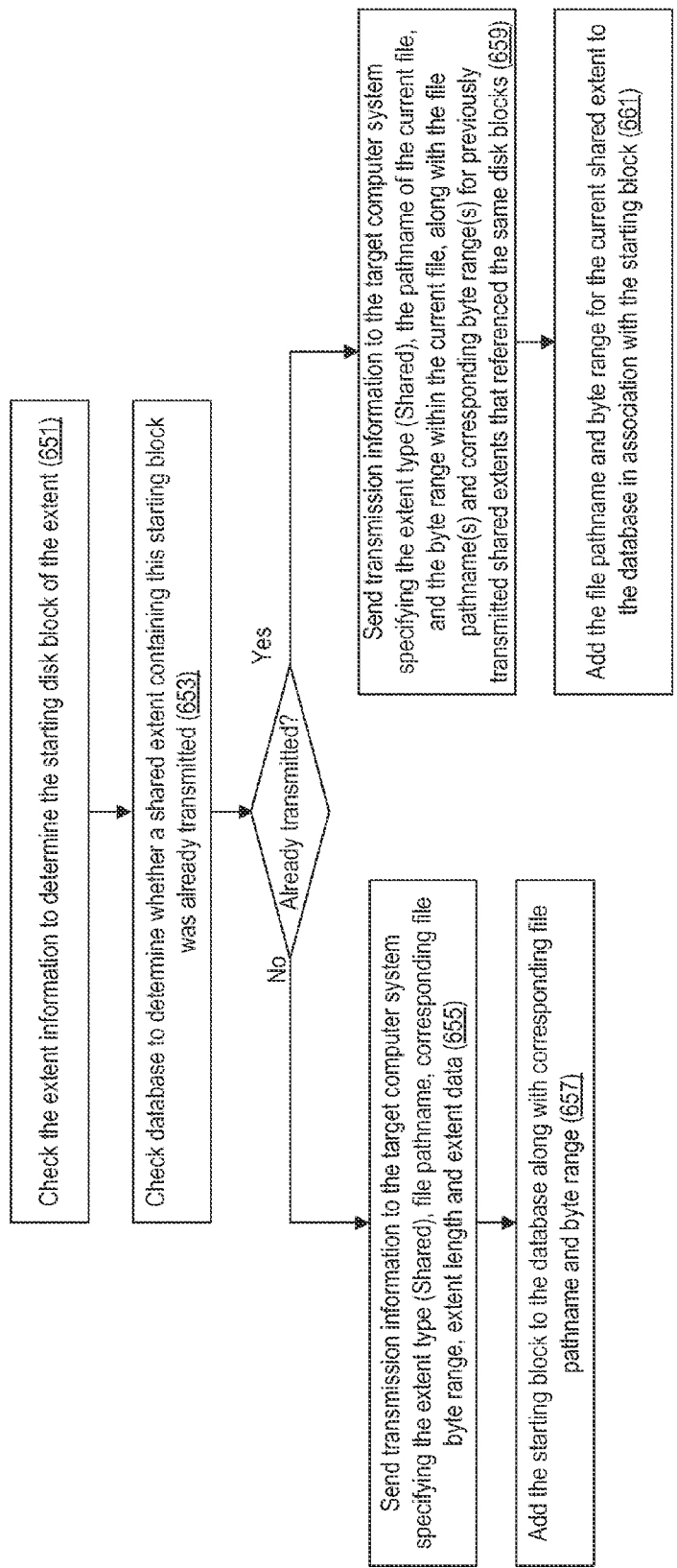
FIG. 7 is a flowchart diagram illustrating how a shared extent may be processed by the source-side replication software according to some embodiments.

If an extent is of the shared extent type 202, then the transmission information sent by the source-side replication software 44 for that extent may depend on whether another shared extent referencing a set of disk blocks which includes the same set of disk blocks referenced by the current extent has previously been transmitted to the target computer system. FIG. 7 is a flowchart diagram illustrating how a shared extent may be processed by the source-side replication software 44 according to some embodiments. As indicated in 651, the source-side replication software 44 may check the extent information for the current shared extent (i.e., the shared extent currently being processed) to determine the set of disk blocks referenced by the current shared extent. For example, the source-side replication software 44 may determine the starting disk block of the current shared extent (e.g., the first disk block of the set of contiguous disk blocks in which the shared data is stored) and the length. The source-side replication software 44 may maintain information, e.g., a database, that uses the block numbers of the starting disk blocks and lengths of various shared extents as a key. As indicated in 653, the source-side replication software 44 may check the database using the disk block range of the current shared extent as a key to determine whether one or more shared extents referencing disk blocks that overlap the disk block range of the current shared extent have already been transmitted to the target computer system.

If the source-side replication software 44 determines that no shared extent with an overlapping block range has yet been transmitted then the source-side replication software 44 may read the shared data from the set of disk blocks. The source-side replication software 44 may send transmission information to the target computer system specifying the extent type (Shared), the pathname of the file to which the shared extent belongs, the byte range in the file which the shared extent represents, the length of the shared data, and the shared data which was read from the set of disk blocks, as indicated in 655. The source-side replication software 44 may also add the block number of the starting block to the database along with other information about the shared extent, such as the file pathname and the byte range represented by the shared extent.

On the other hand, if the source-side replication software 44 determines that another shared extent with the same starting block has already been transmitted to the target computer system then the source-side replication software 44 may not read the shared data again, and may not send the shared data in the transmission information for the current shared extent. In this case the transmission information sent to the target computer system may specify properties of the shared extent, such as the extent type (Shared), the pathname of the file to which the shared extent belongs, and the byte range in the file which the shared extent represents. In addition, the transmission information may also include identification information that enables the target computer system to identify the previous shared extent(s) that referenced the same starting disk block. For example, for each previously encountered shared extent that referenced a set of disk blocks overlapping the disk blocks of the shared extent currently being processed, the transmission information may specify the pathname of the file to which the extent belonged and the byte range within that file which the extent represented, as indicated in 659. The source-side replication software 44 may also add the file pathname and byte range for the current shared extent to the database in association with the starting block, as indicated in 661.

As described below, the system may also perform an incremental replication after an initial full replication has been performed. In the case of an incremental replication it is possible that the data for some of the previously shared extents may have changed since they were first transmitted. Thus, including the identification information for more than one of the previously encountered shared extents may increase the probability that the target computer system can reference at least one of them, e.g., may increase the probability that the data referenced by at least one of them has not been modified or deleted. However, in some embodiments the transmission information sent in 659 may not specify the identification information for all of the previously encountered shared extents that referenced the same starting disk block if there are more than one.

Figure 8:
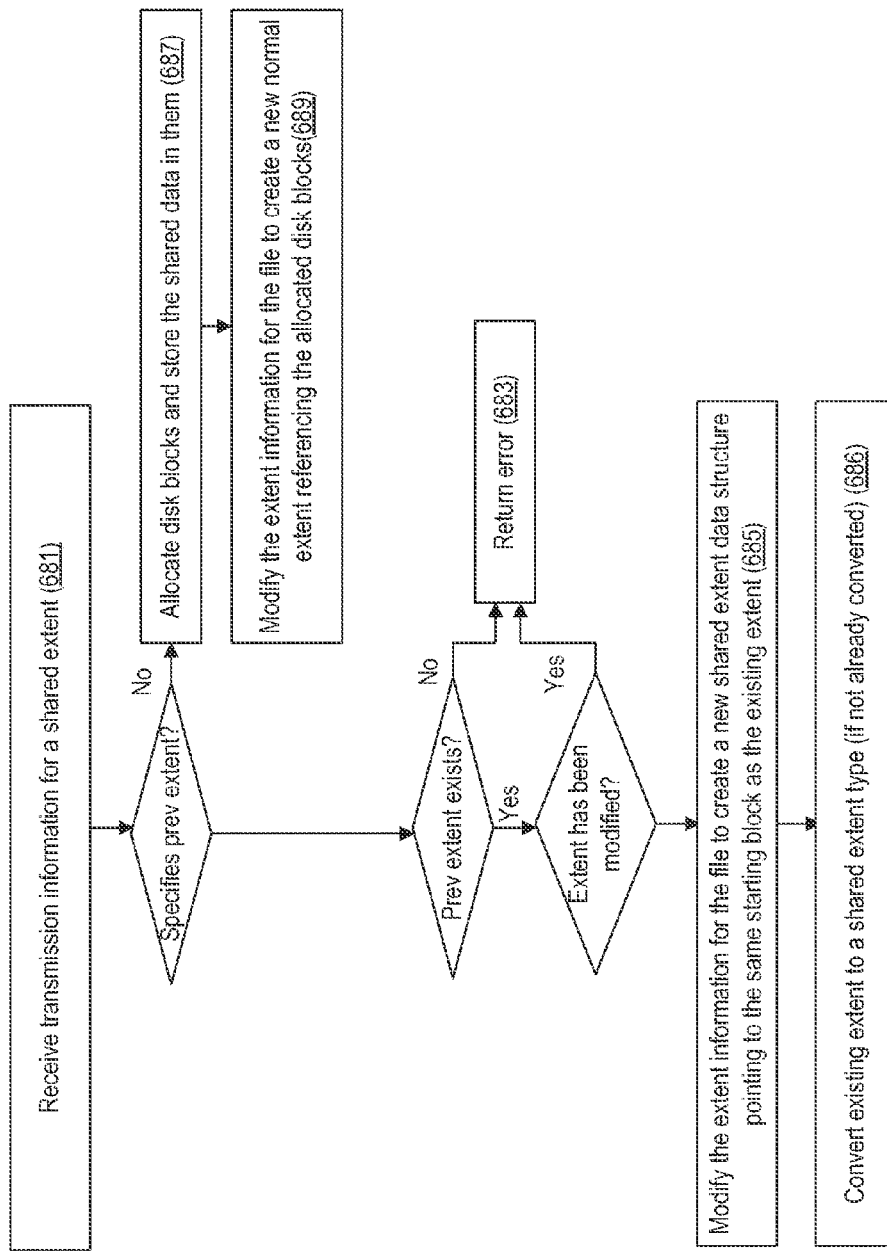
FIG. 8 is a flowchart diagram illustrating how a shared extent may be processed by the target-side replication software according to some embodiments.

FIG. 8 is a flowchart diagram illustrating how a shared extent may be processed by the target-side replication software 54 according to some embodiments. As indicated in 681, the target-side replication software 54 may receive the transmission information for the shared extent. The target-side replication software 54 may analyze the transmission information to determine whether it specifies that a previous shared extent referencing the same data was previously transmitted to the target computer system. If not then the target-side replication software 54 may communicate with the target-side file system software 56 to cause the target-side file system software 56 to allocate a new set of disk blocks and store the shared data included in the transmission information in them (687), and also modify the extent information for the file to create a new normal extent referencing the allocated disk blocks (689). (The extent may initially be created as a normal extent, but may later be changed into a shared extent, as described below.)

Otherwise, if the transmission information specifies that one or more previous shared extents referencing the same data were previously transmitted then the target computer system may determine whether any of these extents still exist (e.g., check whether they have been deleted). If at least one of the previous extents still exists then the target computer system may determine whether the data it references has been modified since it was initially stored. If the target computer system finds at least one previous extent whose data has not been modified then the target computer system may modify the extent information for the current file to create a new shared extent data structure pointing to the same starting block as the previous extent, as indicated in 685. If the previous extent has not yet been converted from a normal extent type to a shared extent type then the previous extent may be converted to a shared extent type, as indicated in 686.

If none of the previous extents still exists in its unmodified state then the target-side replication software 54 may return an error to the source-side replication software 44, as indicated in 683. In this case the source-side replication software 44 may re-transmit the transmission information for the shared extent and include the shared data in the transmission information so that it can be stored on the target side.

Figure 9:
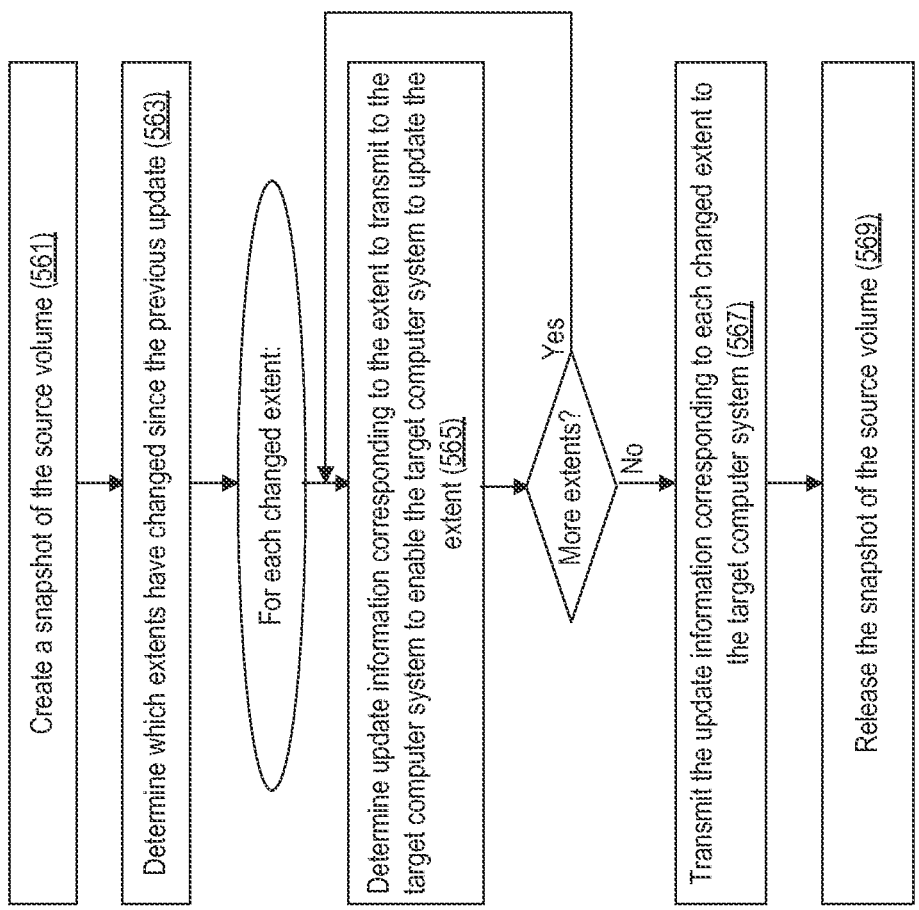
FIG. 9 is a flowchart diagram illustrating one embodiment of a method that may be performed by the source computer system during an incremental update.

In some embodiments the source-side replication software 44 may communicate with the target-side replication software 54 to perform an incremental update of the copies of the files on the target computer system to keep them synchronized with the source files, e.g., where the source files have changed after the initial full replication was performed. FIG. 9 is a flowchart diagram illustrating one embodiment of a method that may be performed by the source computer system during an incremental update. In 561 the source computer system may create a snapshot of the source volume. In 563 the source computer system may determine which extents have changed since the previous update (e.g., since the initial full replication or since the previous incremental update in case this is not the first incremental update). As indicated in 565, for each extent that has changed, the source computer system may determine update information corresponding to the extent to transmit to the target computer system to enable the target computer system to update the extent in the copy of the file on the target computer system. The update information corresponding to each changed extent may be transmitted to the target computer system (567), and the snapshot of the source volume may be released (569).

Figure 10:
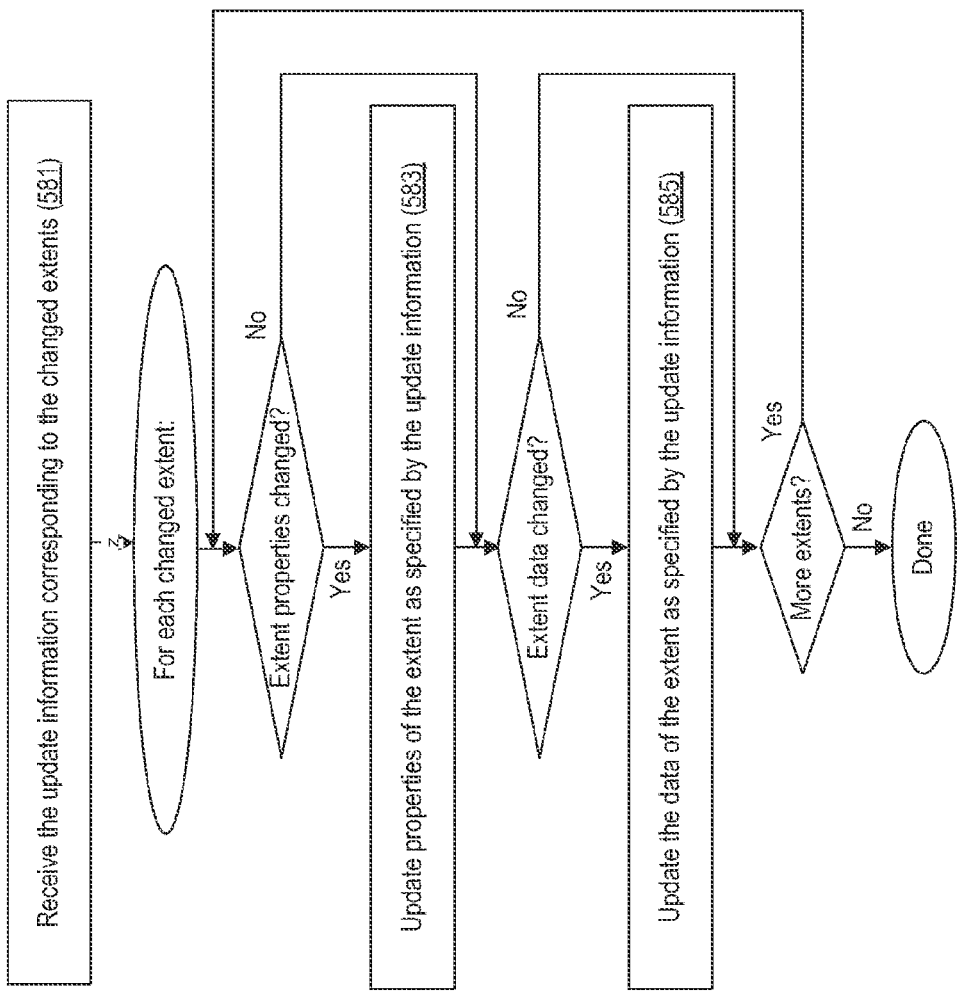
FIG. 10 is a flowchart diagram illustrating one embodiment of a method that may be performed by the target computer system during an incremental update.

FIG. 10 is a flowchart diagram illustrating one embodiment of a method that may be performed by the target computer system during an incremental update. The target computer system may receive the update information corresponding to the changed extents (581). For each changed extent, the target computer system may determine whether the update information indicates that properties of the extent (other than the file data referenced by the extent) have changed. For example, the extent may have been converted into another type of extent, or the extent may have been extended to represent a greater byte range. If any extent properties have changed then the target computer system may update the properties of the extent as specified by the update information (583), or create one or more new extents to replace the existing extent (e.g, if the extent type is changed, or if the extent is split into multiple extents). The target computer system may also determine whether the update information indicates that the file data referenced by the extent has changed. If so then the target computer system may update the data of the extent as specified by the update information (585). Thus, after the update information for all the changed extents has been processed the copies of the files on the target computer system may once again be in sync with the files on the source computer system.

Figure 11:
FIG. 11 illustrates an example of three files on the source computer system which the source computer system may replicate to the target computer system.

FIG. 11 illustrates an example of three files 210A, 210B and 210C on the source computer system which the source computer system may replicate to the target computer system. The file 210A has four extents: a normal extent 215A, a compressed extent 215B, another normal extent 215C, and a shared extent 215D. The file 210B has two extents: a ZFOD extent 215E and a shared extent 215S which references the same disk blocks as the shared extent 215D of the file 210A. The file 210C has four extents: a compressed extent 215F, a hole extent 215G, a normal extent 215H, and a ZFOD extent 215J.

Figure 12:
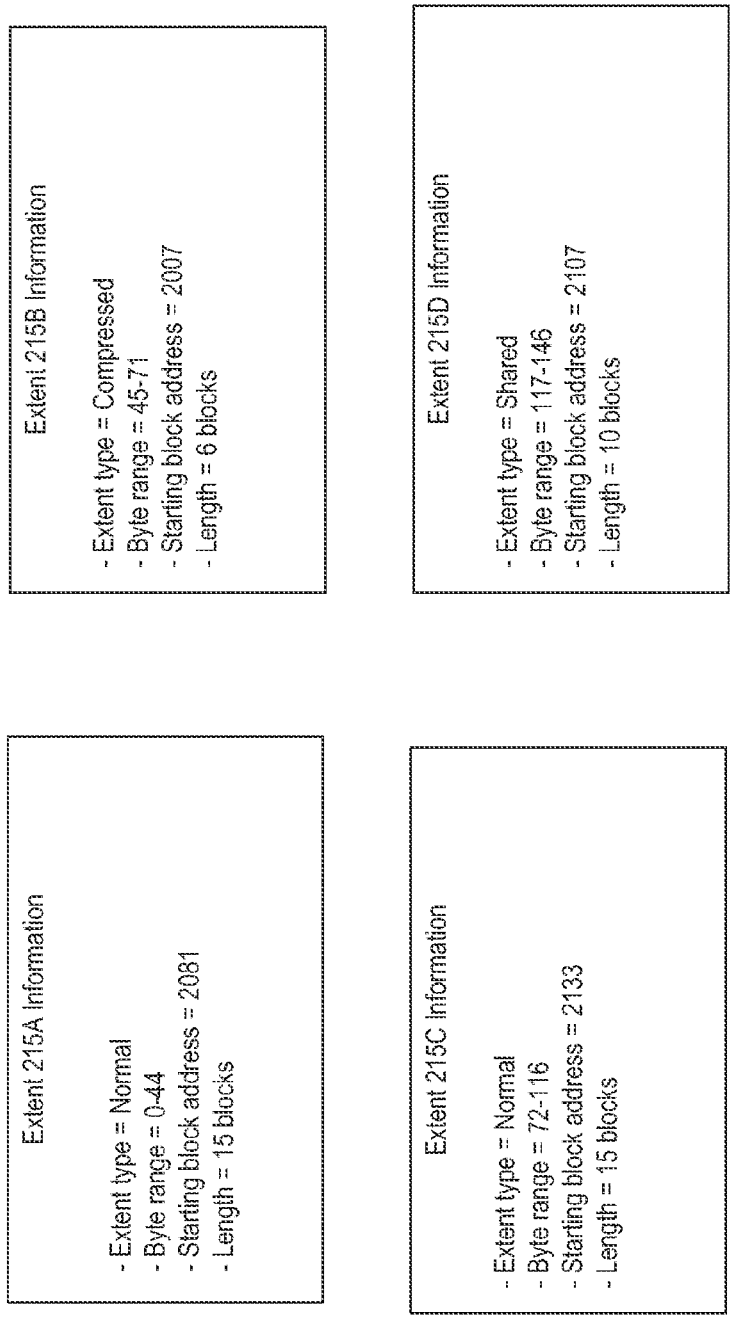
FIGS. 12, 13 and 14 illustrate extent information (meta-data) maintained by the source-side file system software for the three files.
Figure 13:
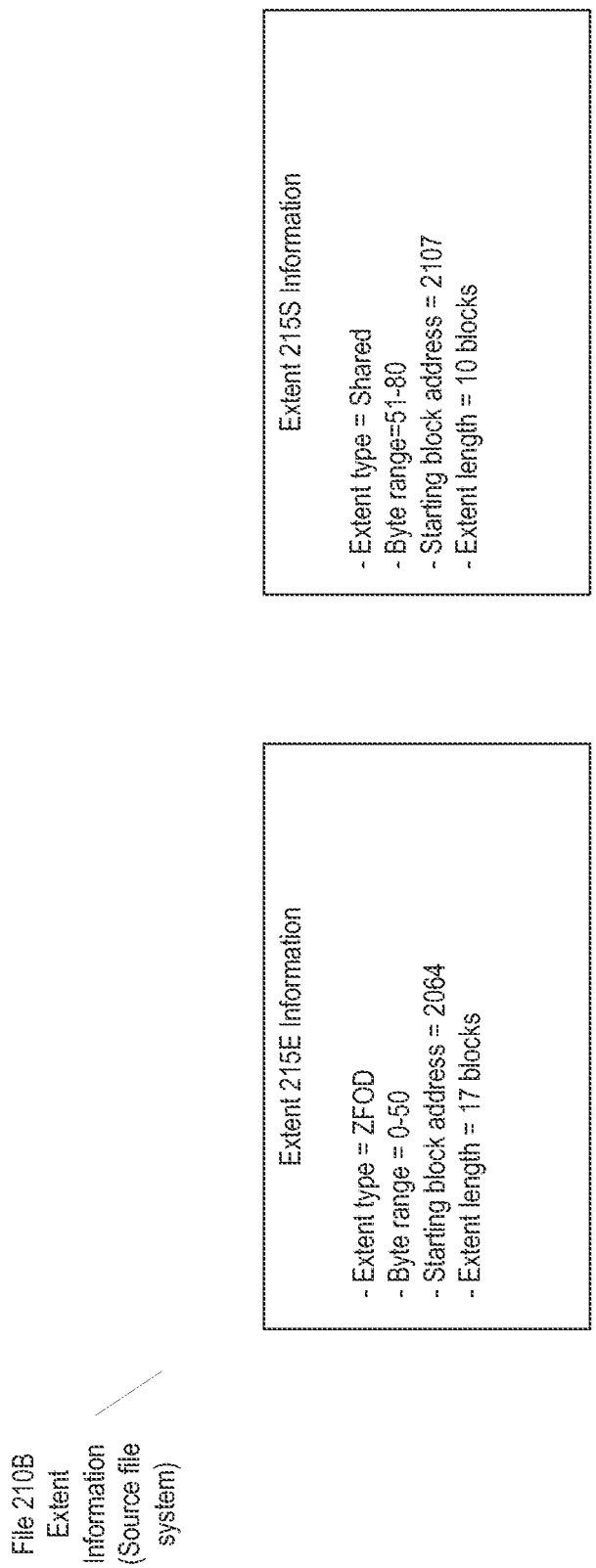
Figure 14:
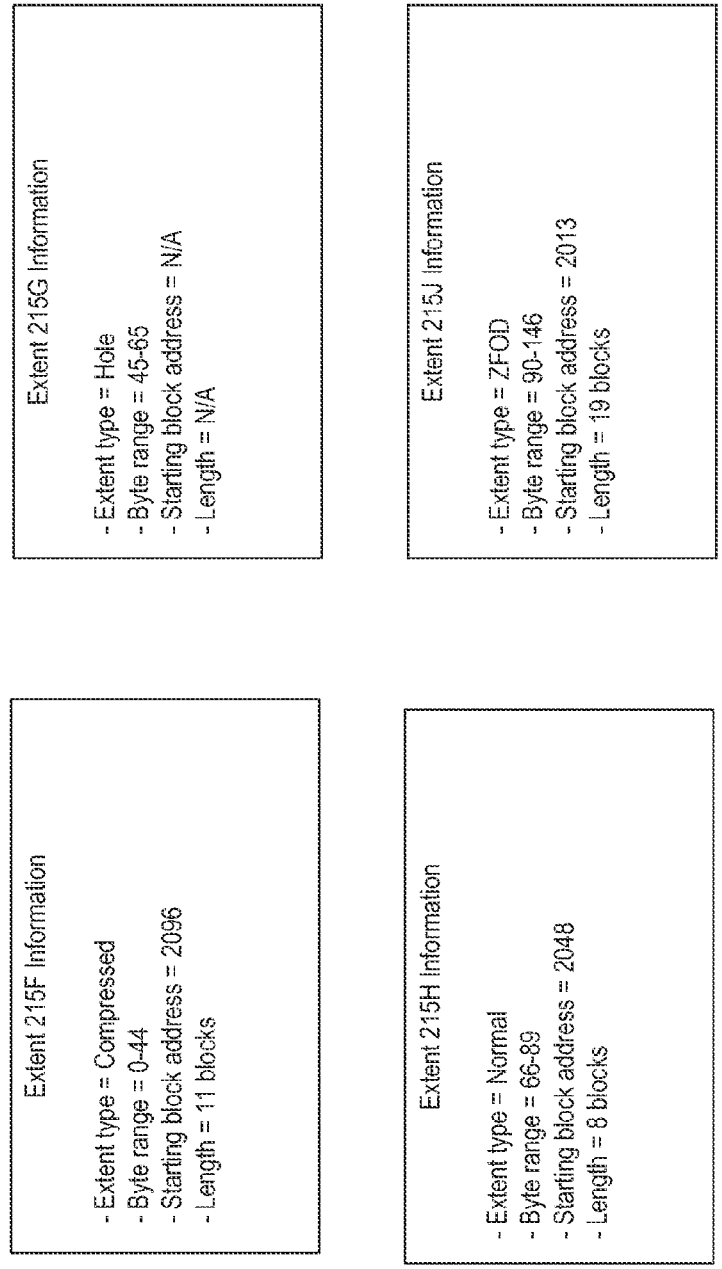

FIGS. 12, 13 and 14 illustrate extent information (meta-data) maintained by the source-side file system software 46 for the files 210A, 210B and 210C, respectively. In various embodiments the file system may store any of various kinds of information about each extent, and may use any of various kinds of meta-data structures to store the extent information. In some embodiments the extent information for the extents may specify information such as the file offsets or byte range represented by the extent, the extent type, the starting disk block number where the extent data is stored, and the length of the extent data (e.g., in terms of disk blocks or bytes).

Figure 15:
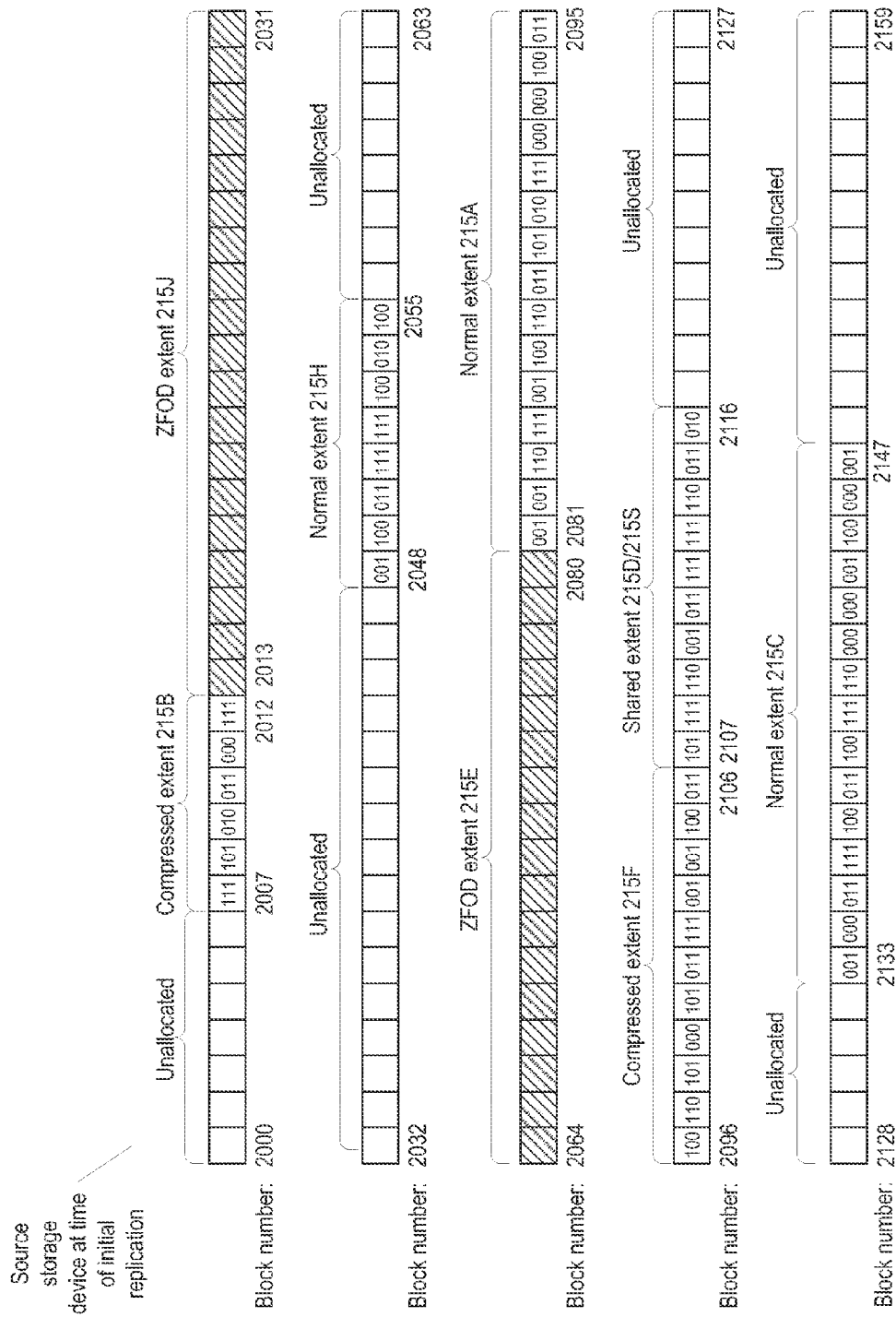
FIG. 15 shows how the extent data for the three files may be arranged on the disk of the source computer system.

FIG. 15 shows how the extent data for the three files 210A, 210B and 210C is arranged on the disk of the source computer system. In this example, each extent is only a few bytes in length. This is not intended as a realistic example, but is done for the purposes of illustration to be able to show all the extents in the drawings (see FIG. 15). In a typical real-world system there may be a minimum extent length, such as 4 KB for example. Also, each disk block may have a relatively large size such as 512 bytes or 4 KB for example.

As shown in FIG. 12, the extent information for the extent 215A of the file 210 specifies that the extent is an extent of the normal extent type which represents the logical bytes 0-44 of the file 210A, where the extent data is stored on the disk beginning at block number 2081. The actual extent data corresponding to the logical bytes 0 of the file is shown in the disk blocks. (For the purposes of illustration, the data is shown in an abbreviated form, e.g., 001 for disk block 2081, 001 for disk block 2081, etc.) The other extent information shown in FIGS. 12-14 matches FIG. 15 in a similar manner. For the ZFOD extents 215E and 215J, a line pattern is shown in the disk blocks to indicate that these disk blocks may contain random data since the disk blocks have been allocated without actually writing 0's into them. Note that no set of disk blocks corresponding to the hole extent 215G is shown in FIG. 15 since none may be allocated for this type of extent. Also notes that the shared extents 215D and 215S reference the same set of disk blocks.

Figure 16:
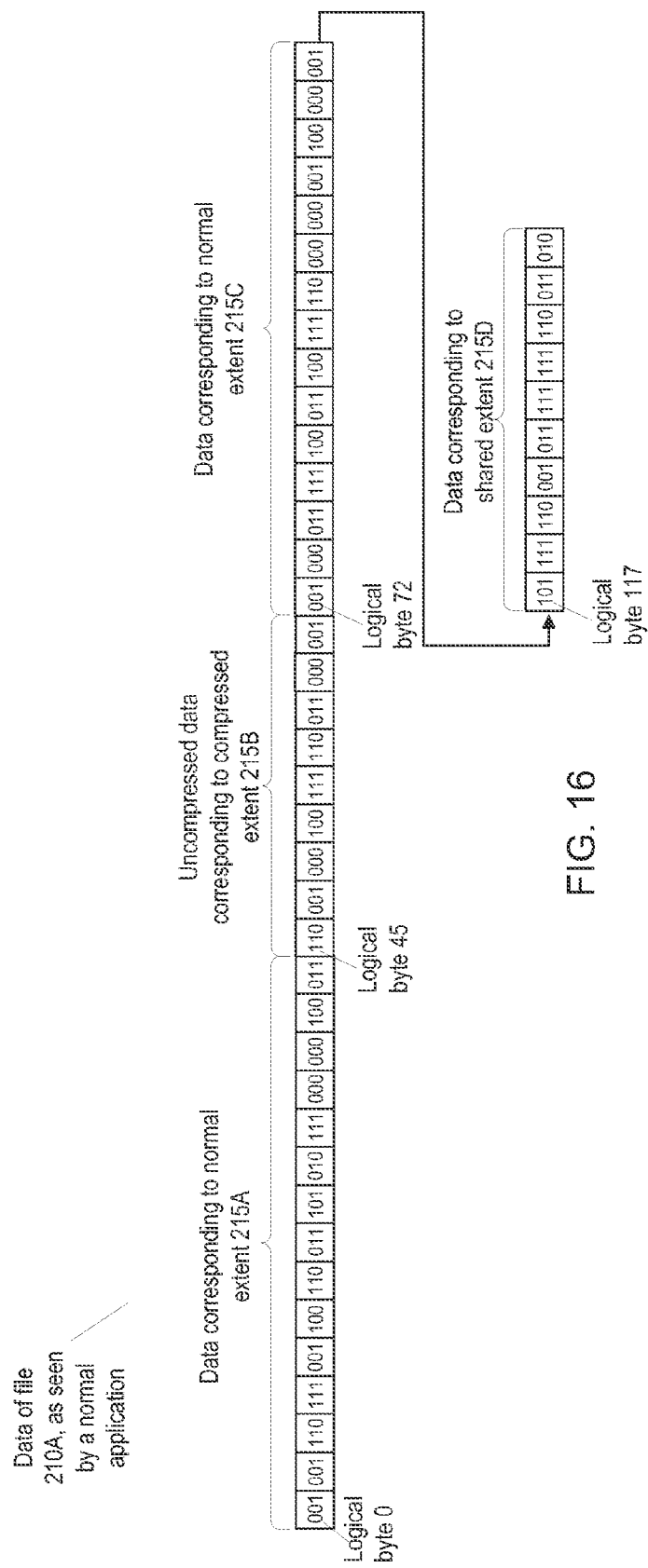
FIG. 16 illustrates the data for the first file as it may be seen by a normal application that reads the file through the normal read interface provided by the file system.

FIG. 16 illustrates the data for the file 210A as it may be seen by a normal application that reads the file through the normal read interface provided by the file system. The application may simply see the file as a stream of bytes without any knowledge of the extent structure although the byte ranges represented by the extents are shown in the drawing. Note that the application sees the data corresponding to the compressed extent 215B in its uncompressed form (e.g., 110 001 000 100 111 110 011 000 001), which is different than the compressed data (e.g., 111 101 010 011 000 111) stored on the disk.

FIG. 17 shows the transmission information for the extents 215A-215D of the file 210A which may be sent to the target computer system. Note that the transmission information for the extent 215B includes the compressed data as it is stored on the disk, not the uncompressed data seen by a normal application. This may reduce the amount of data that needs to be transmitted to the target computer system. In this case, it is assumed that the shared extent 215S of the file 210B has not yet been replicated on the target computer system, and so the transmission information for the shared extent 215D includes the data stored in the disk blocks 2107-2116.

Figure 18:
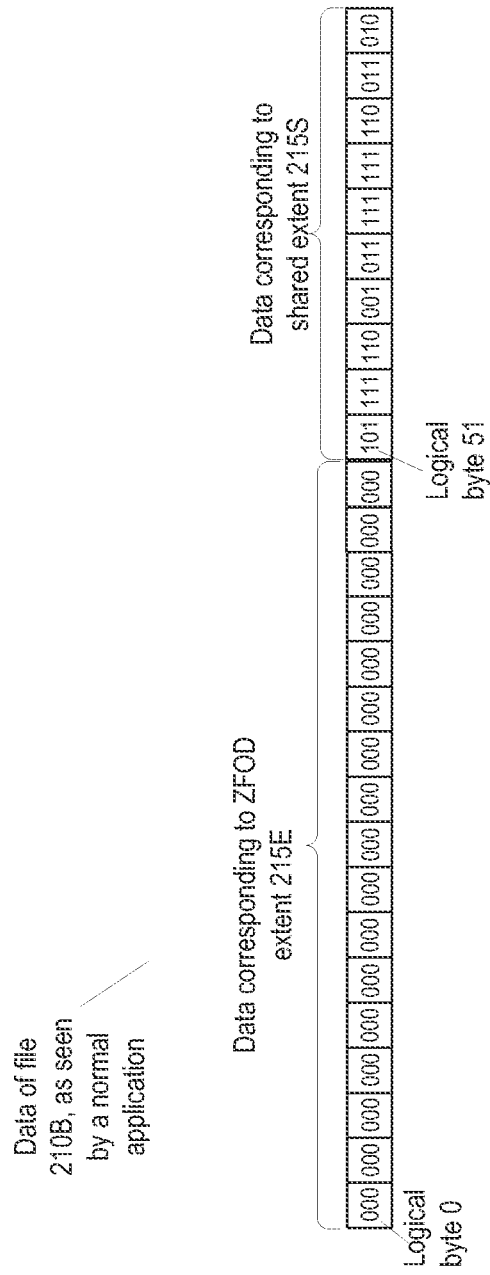
FIG. 18 illustrates the data for the second file as it may be seen by a normal application that reads the file through the normal read interface provided by the file system.

FIG. 18 illustrates the data for the file 210B as it may be seen by a normal application that reads the file through the normal read interface provided by the file system. Note that the application sees the data corresponding to the ZFOD extent 215E as all 0's, although these 0's are not actually stored on the disk.

Figure 19:
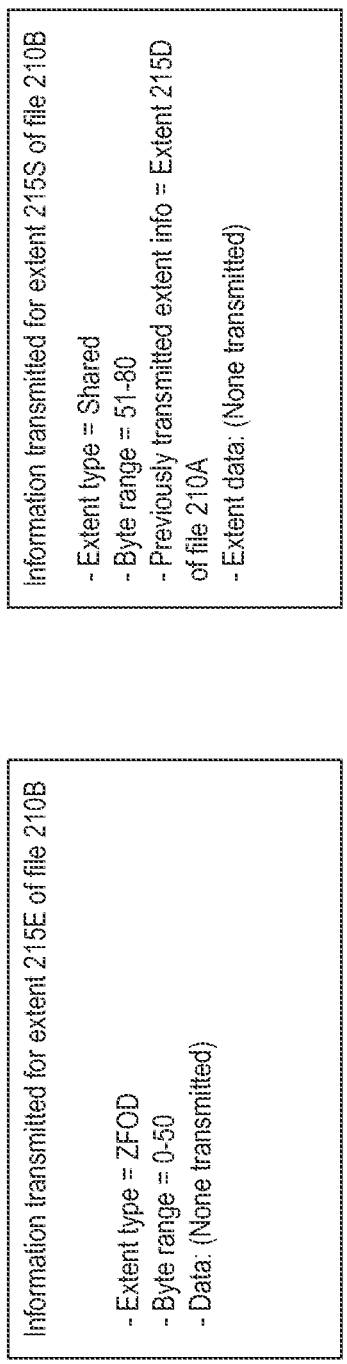
FIG. 19 shows the transmission information for the extents of the second file which may be sent to the target computer system.

FIG. 19 shows the transmission information for the extents 215E and 215S of the file 210B which may be sent to the target computer system. Note that the transmission information for the extent 215E only includes meta-data about the extent, and does not include any file data, e.g., does not include the 0's which the normal application sees as mentioned above with reference to FIG. 18. This may reduce the amount of data that needs to be transmitted to the target computer system. Also note that the transmission information for the extent shared 215S does not include the data stored in the disk blocks 2107-2116, since the target computer system should already have this data because the other shared extent 215D has already been replicated to the target computer system. The transmission information for the shared extent 215S includes information identifying the extent 215D of the file 210A so that the target computer system can look up this extent and create the extent 215S in the copy of the file 210B so that it references the same set of disk blocks on the target computer system.

Figure 20:
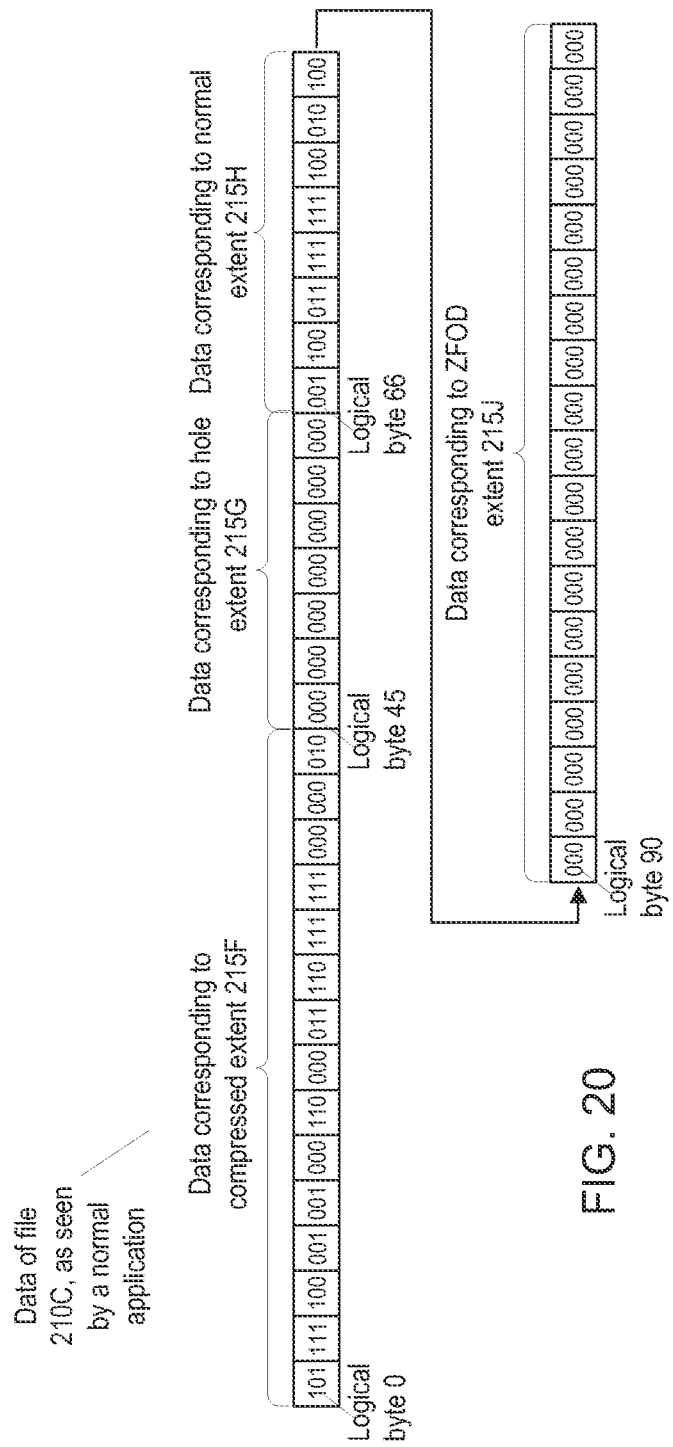
FIG. 20 illustrates the data for the third file as it may be seen by a normal application that reads the file through the normal read interface provided by the file system.

FIG. 20 illustrates the data for the file 210C as it may be seen by a normal application that reads the file through the normal read interface provided by the file system. Note that the application sees the data corresponding to the hole extent 215G and the ZFOD extent 215J as all 0's, although these 0's are not actually stored on the disk. Note also that the application sees the data corresponding to the compressed extent 215F in its uncompressed form, which is different than the compressed data stored on the disk.

FIG. 21 shows the transmission information for the extents 215F, 215G, 215H, and 215J of the file 210C which may be sent to the target computer system.

Figure 22:
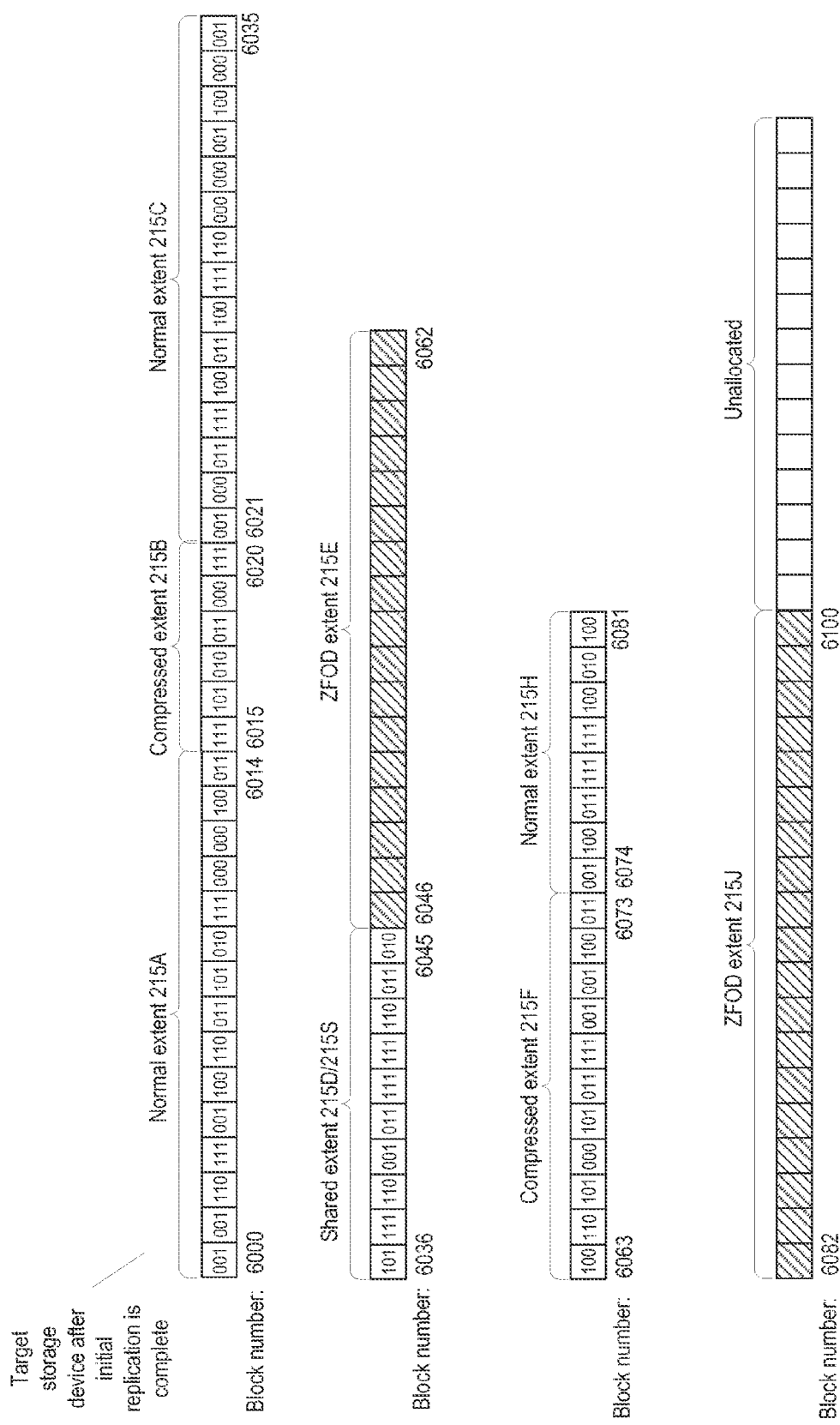
FIG. 22 shows the disk of the target computer system after the initial replication of the three files is complete.

FIG. 22 shows the disk of the target computer system after the replication of the files 210A-210C is complete. In this example, each extent of these files has been replicated to the target disk, but the extents are positioned differently with respect to each other versus their relative layout on the disk of the source computer system. In other embodiments the source computer system may transmit information indicating the relative layout of the extents on the source disk, and the target computer system may not only create the extents, but also ensure that they have the same relative layout as on the source disk.

Figure 23:
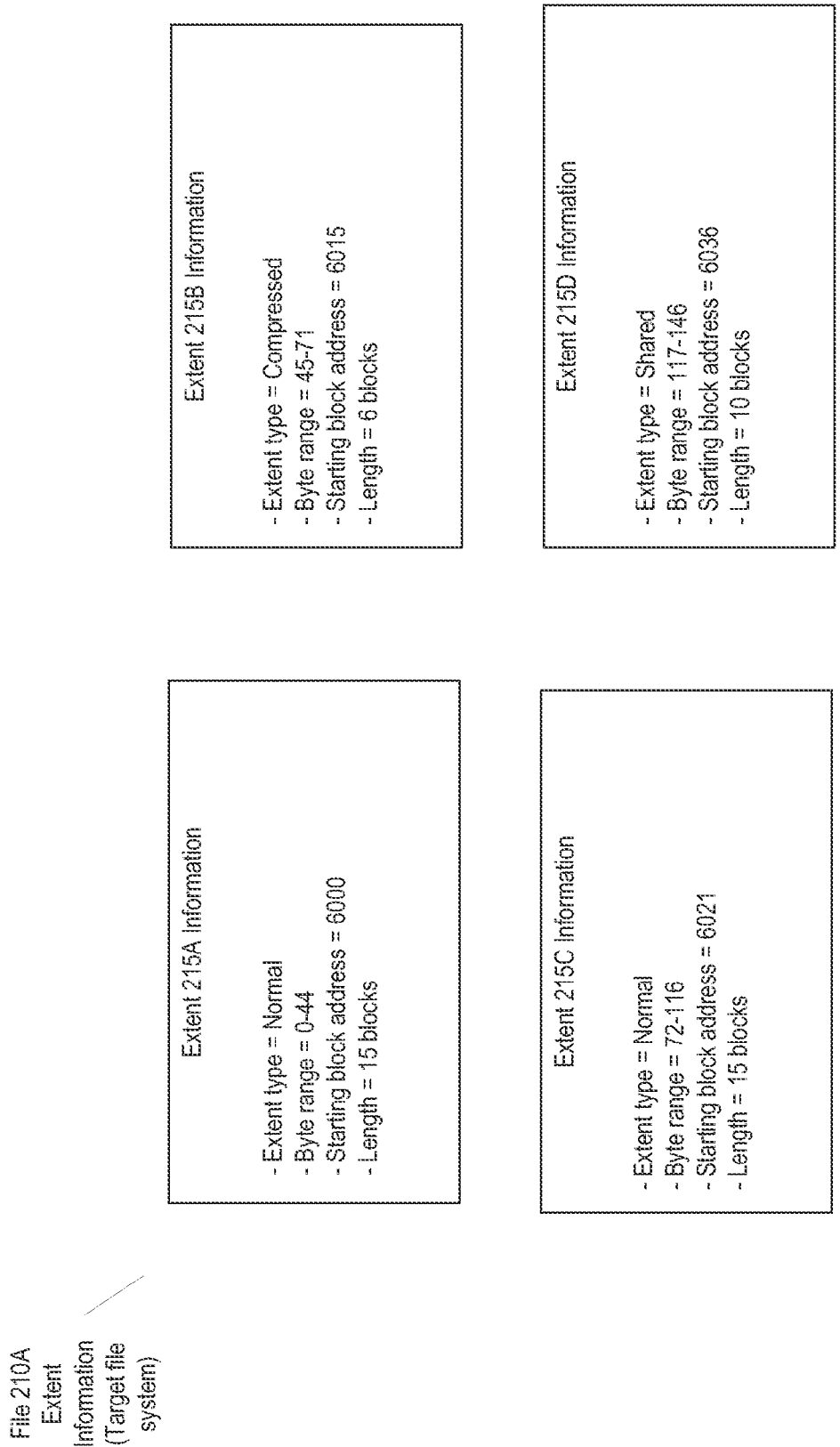
FIGS. 23, 24, and 25 illustrate the extent information (meta-data) created by the target-side file system software during the initial replication for the three files.
Figure 24:
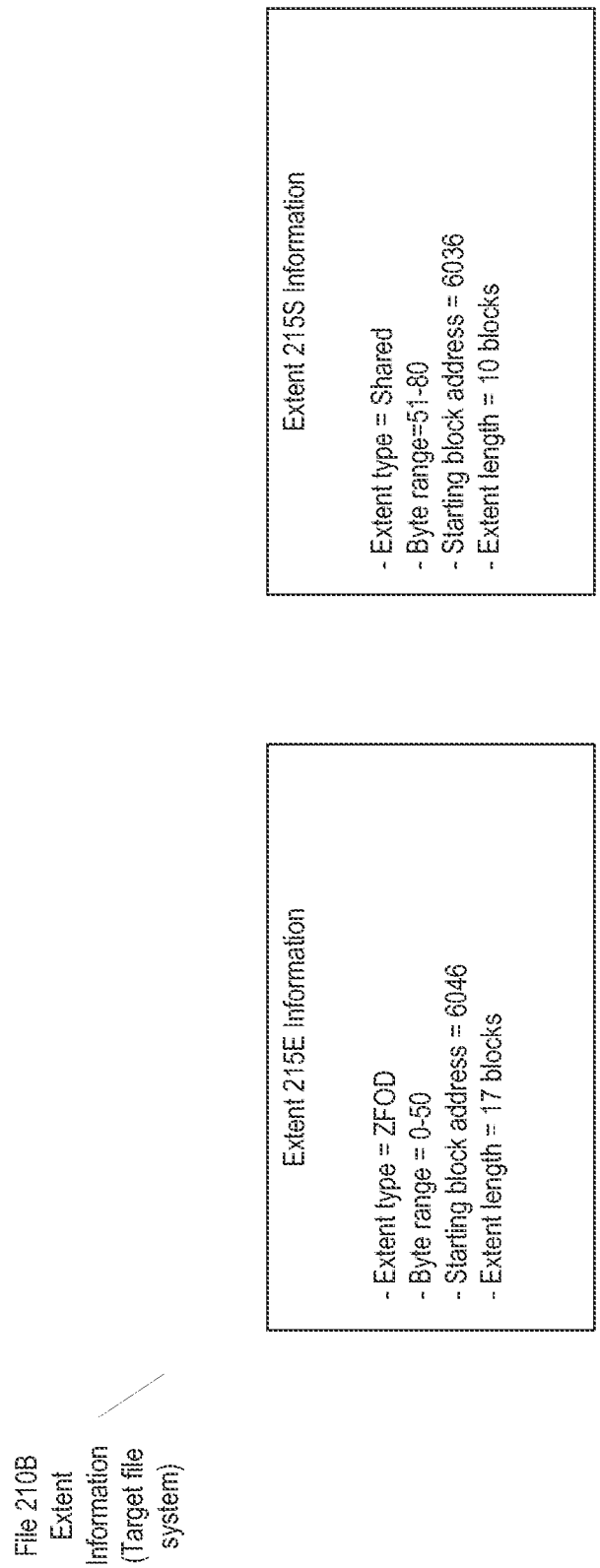
Figure 25:
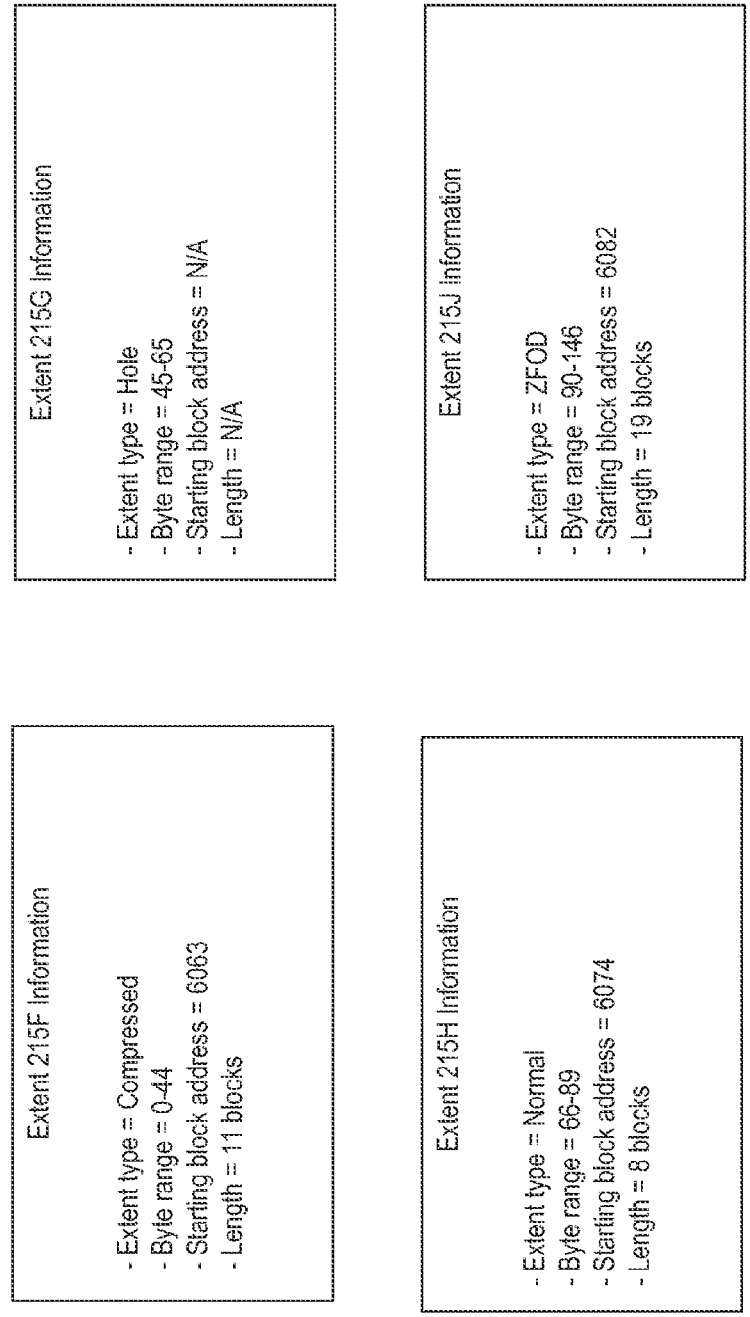

FIGS. 23, 24, and 25 illustrate the extent information (meta-data) created by the target-side file system software 56 during the replication for the files 210A, 210B and 210C, respectively. The target-side extent information shown in FIGS. 23-25 is similar to the source-side extent information shown in FIGS. 12-14, but the starting disk block numbers are different since the set of disk blocks for each extent may begin at a different starting block on the target-side disk than on the source-side disk.

Figure 26:
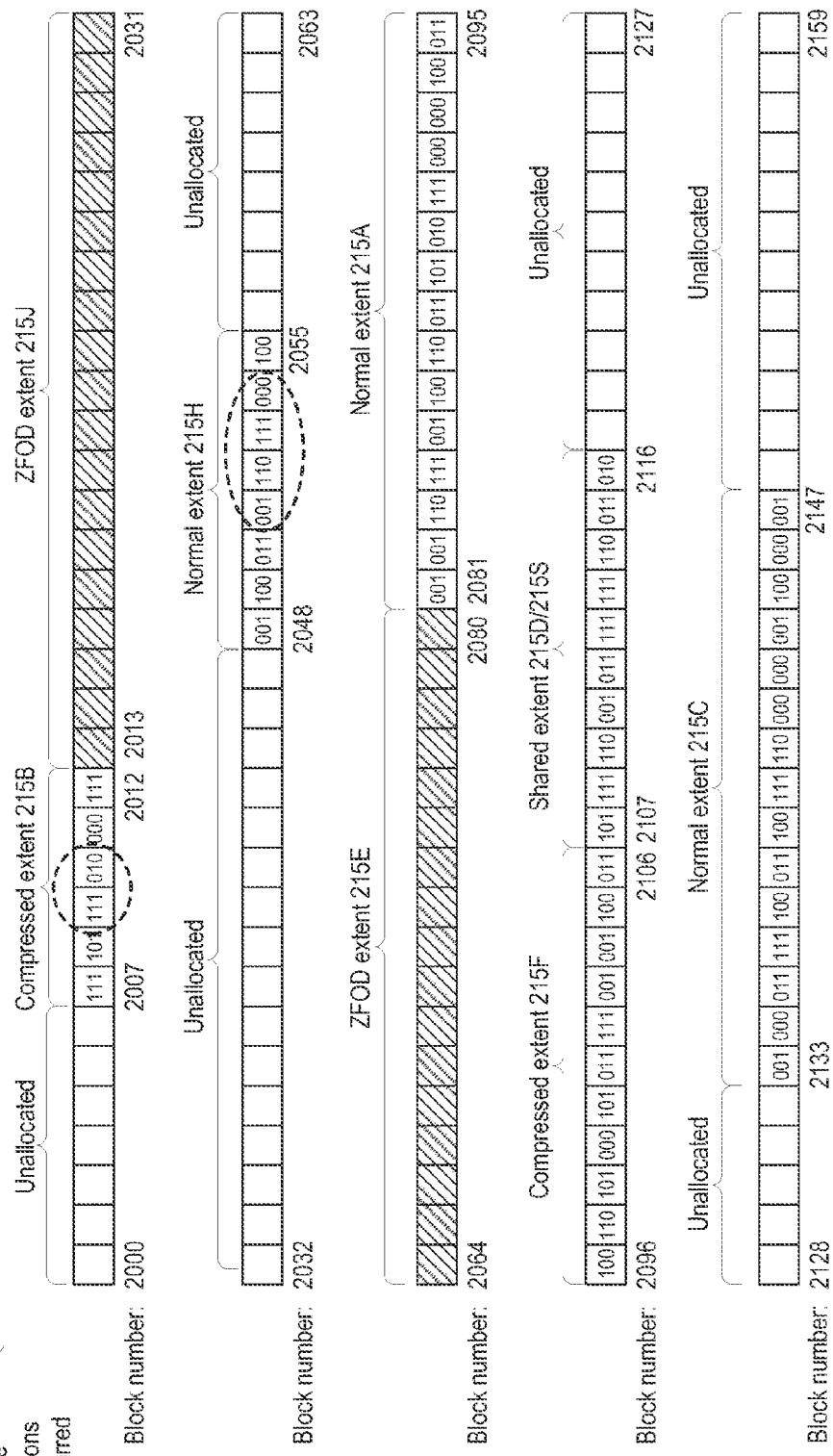
FIG. 26 shows an example of how the disk of the source computer system may appear at a later time T1 after modifications to the three files have occurred.

FIG. 26 shows an example of how the source storage device may appear at a later time T1 after one or more file modifications have occurred. As indicated by the dashed ovals, the data in the compressed extent 215B and the normal extent 215H has been changed. The system may then perform an incremental update to bring the copies of the files on the target side back into sync with the files on the source side.

Figure 27:
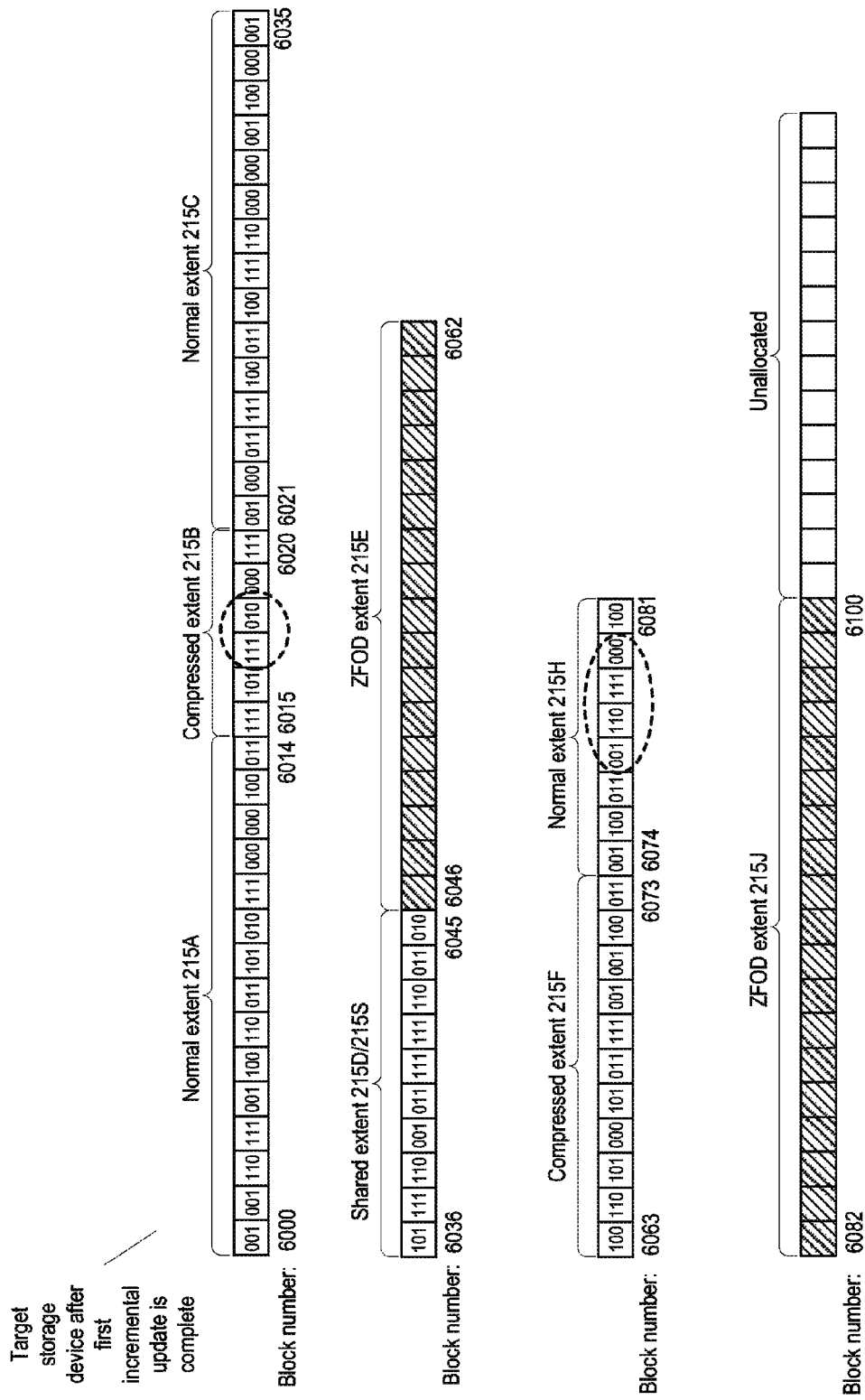
FIG. 27 shows an example of how the disk of the target computer system may appear after a first incremental update is performed to re-synchronize the three files with the source computer system.

FIG. 27 shows the disk of the target computer system after this incremental update is complete. As shown, the data in the extents 215B and 215H has been changed to match these extents on the source side.

In some embodiments, if an extent corresponds to a large set of disk blocks and only a few of the disk blocks have changed, it is not necessary for the source computer system to re-transmit all of the data for the extent. For example, the system may perform extent updates at a finer level of granularity by segmenting an extent and re-transmitting only the changed segment(s) of the extent.

Figure 28:
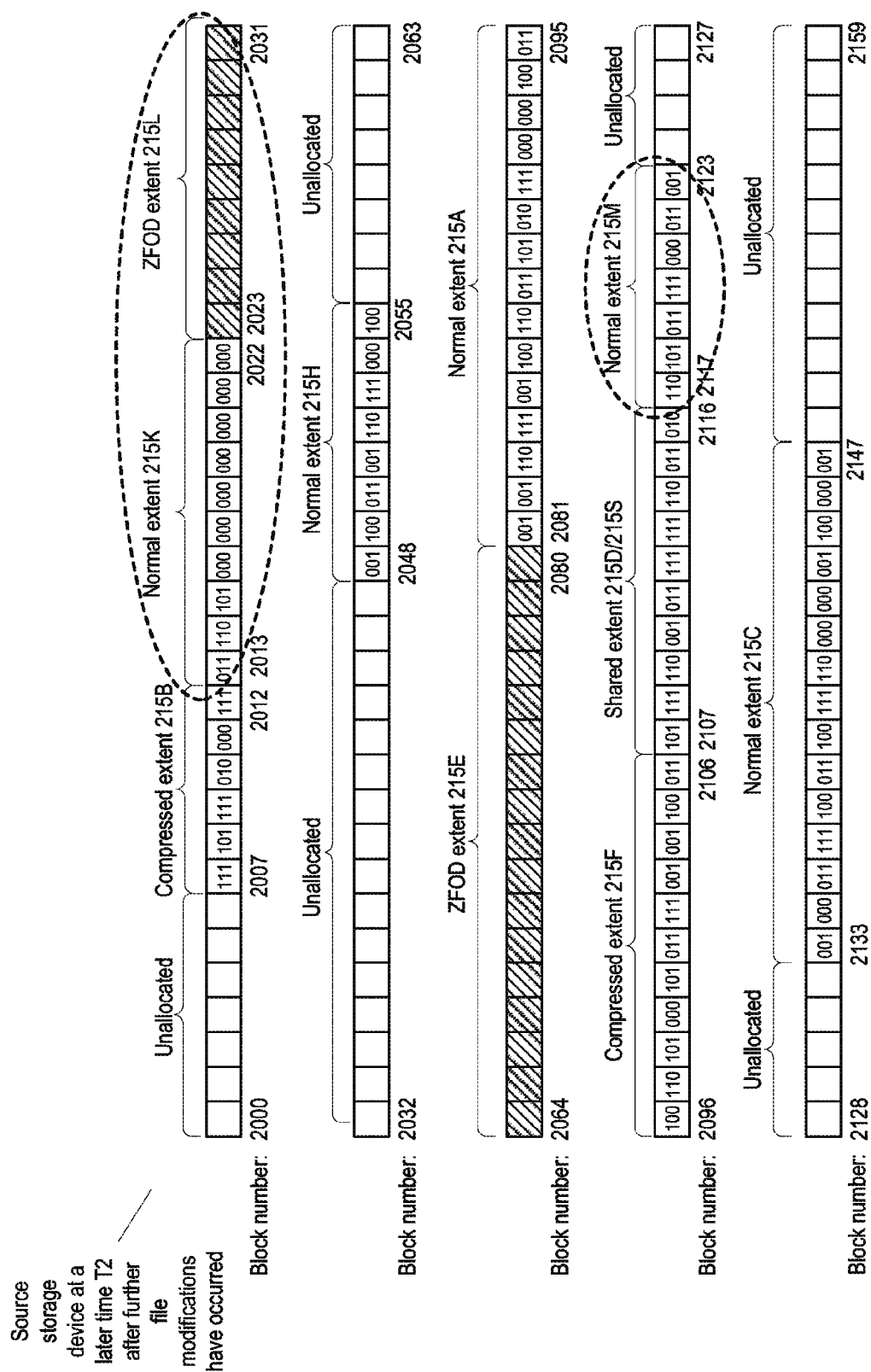
FIG. 28 shows an example of how the disk of the source computer system may appear at a later time T2 after further modifications to the three files have occurred.

FIG. 28 shows an example of how the source storage device may appear at a later time T2 after one or more additional file modifications have occurred after the first incremental update was performed. The original ZFOD extent 215J has been split into two new extents: a normal extent 215K and a ZFOD extent 215L. For example, an application may have requested data to be written beginning at the initial file offset represented by the ZFOD extent 215J. The source-side file system software 46 may have converted the disk blocks 2013-2022 into a normal extent 215K, written the data into the first three disk blocks of the normal extent 215K, and padded the rest of the disk blocks of the normal extent 215K with 0's.

The hole extent 215G has also been converted into a new normal extent 215M. For example, an application may have requested data to be written at the file offset in the file 210C represented by the hole extent 215G. Thus, the source-side file system software 46 has allocated a new set of disk blocks for the normal extent 215M, written the data into these disk blocks, and updated the extent meta-data accordingly.

Figure 29:
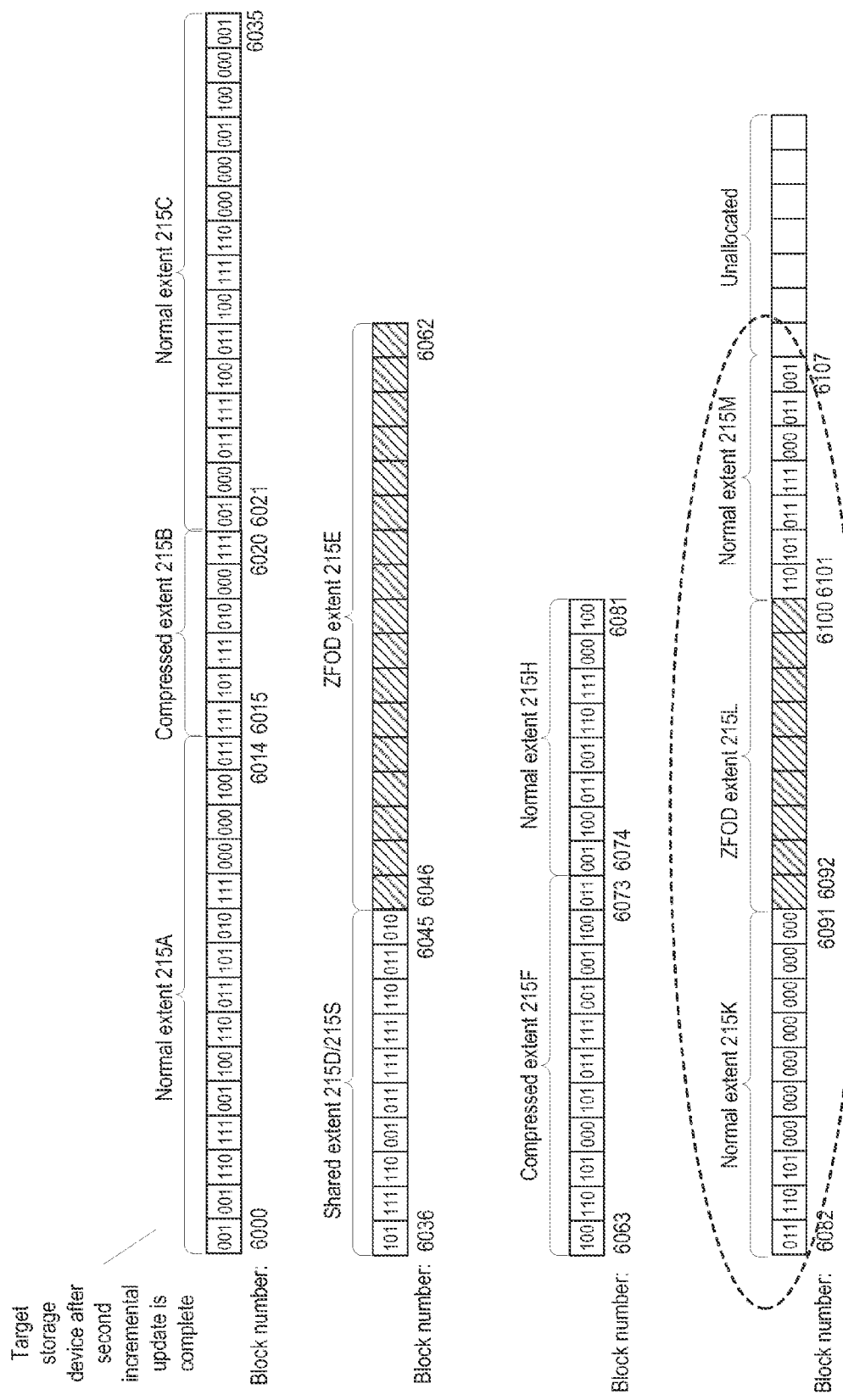
FIG. 29 shows an example of how the disk of the target computer system may appear after a second incremental update is performed to re-synchronize the three files with the source computer system.

FIG. 29 shows the disk of the target computer system after another incremental update is complete. As shown, the ZFOD extent 215J has been split into the normal extent 215K and the ZFOD extent 215L on the target side to match the source side, and the hole extent 215G has also been converted into the normal extent 215M.

Figure 30:
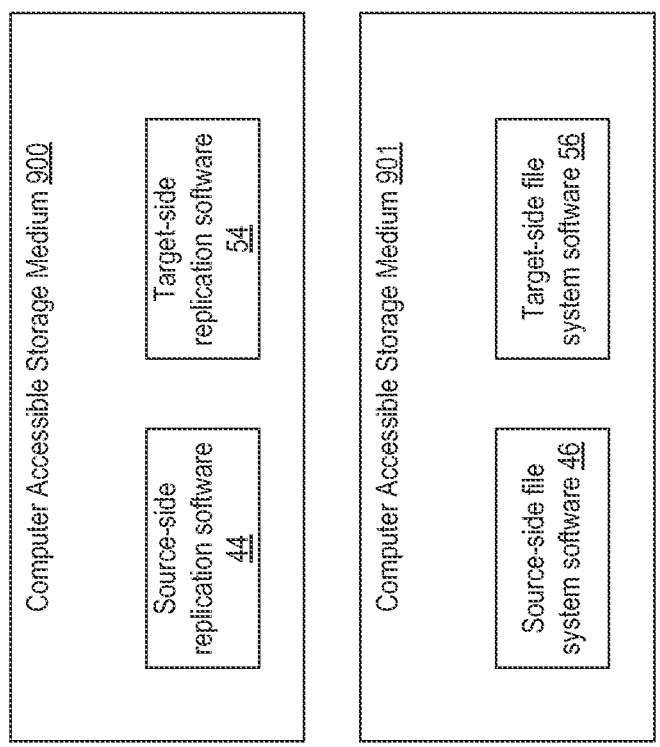
FIG. 30 illustrates an example of computer accessible storage mediums according to one embodiment.

Turning now to FIG. 30, a block diagram of computer accessible storage mediums 900 and 901 are shown. The computer accessible storage medium 900 may store program instructions of the source-side replication software 44 and the target-side replication software 54. The computer accessible storage medium 901 may store program instructions of the source-side file system software 46 and the target-side file system software 56. The program instructions stored on the computer accessible storage mediums 900 and 901 may be executable by one or more processors to implement various functions described above. In some embodiments the replication software and file system software may be stored together. Generally speaking, various embodiments of a computer accessible storage medium are contemplated for storing any set of instructions which, when executed, implement a portion or all of the functions described above.

A computer accessible storage medium may include any storage media accessible by one or more computers during use to provide instructions and/or data to the computer(s). For example, a computer accessible storage medium may include storage media such as magnetic or optical media, e.g., one or more disks (fixed or removable), tapes, CD-ROMs, DVD-ROMs, CD-Rs, CD-RWs, DVD-Rs, DVD-RWs, or Blu-Ray disks. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, a flash memory interface (FMI), a serial peripheral interface (SPI), etc. Storage media may include microelectromechanical systems (MEMS), as well as storage media accessible via a communication medium such as a network and/or a wireless link. A carrier medium may include computer accessible storage media as well as transmission media such as wired or wireless transmission.

Numerous variations and modifications will become apparent to those skilled in the art once the above disclosure is fully appreciated. It is intended that the following claims be interpreted to embrace all such variations and modifications.

What is claimed is:

1. A non-transitory computer-accessible storage medium storing program instructions executable by a source computer system to cause the source computer system to:

replicate a file from the source computer system to a target computer system, wherein the program instructions are executable to cause the source computer system to perform at least the following operations in replicating the file:

receive extent information identifying extents of the file;

determine from the extent information that the file includes a first extent of a first extent type and one or more additional extents including a compressed extent, wherein the first extent type is one of a plurality of extent types and the one or more additional extents have a corresponding one or more additional extent types, wherein each of the one or more additional extent types is one of the plurality of extent types, and wherein the compressed extent includes data compressed by a file system of the source computer system in response to receiving original data from an application;

determine first transmission information corresponding to the first extent to transmit to the target computer system, wherein the first transmission information specifies the first extent type;

transmit the first transmission information to the target computer system, wherein the first transmission information enables the target computer system to replicate the first extent; and for each of the one or more additional extents:
determine respective transmission information, corresponding to that additional extent, specifying the respective extent type of that additional extent, including specifying a compressed extent type for the compressed extent; and
transmit the respective transmission information to the target computer system, wherein the respective transmission information enables a file system of the target computer system to replicate the respective additional extent;

wherein the first transmission information and the respective transmission information for each of the one or more additional extents enable the target computer system to preserve an extent structure of the file, wherein the extent structure comprises a quantity of the extents and the respective extent type of the extents, including the first extent of the first extent type and the one or more additional extents having the corresponding one or more additional extent types.

2. The non-transitory computer-accessible storage medium of claim 1, further storing additional program instructions executable by the target computer system to cause the target computer system to:
create a copy of the file on the target computer system, wherein the additional program instructions are executable to cause the target computer system to perform at least the following operations in creating the copy of the file:
receive the first transmission information corresponding to the first extent from the source computer system;
analyze the first transmission information to determine that the first transmission information specifies the first extent type; and
send a file system of the target computer system a request to create the first extent in the copy of the file, wherein the request to create the first extent specifies the first extent type.

3. The non-transitory computer-accessible storage medium of claim 2,
wherein in causing the target computer system to create the copy of the file, the additional program instructions are executable to cause the target computer system to create a respective new extent corresponding to each of the one or more additional extents, wherein the respective new extent is an extent of the same extent type as the additional extent to which the respective new extent corresponds.

4. The non-transitory computer-accessible storage medium of claim 1,
wherein the first extent specifies that a particular set of data corresponds to a first byte range of the file, wherein the program instructions are executable to cause the source computer system to replicate the file to the target computer system without transmitting the particular set of data to the target computer system.

5. The non-transitory computer-accessible storage medium of claim 1,
wherein the first extent corresponds to a first byte range of the file and corresponds to a first set of storage locations of a storage device, wherein the first set of storage locations is allocated to the file;
wherein the program instructions are executable to cause the source computer system to replicate the file to the target computer system without reading data from the first set of storage locations.

6. The non-transitory computer-accessible storage medium of claim 1,
wherein the first extent corresponds to a first byte range of the file and corresponds to a first set of storage locations of a storage device, wherein the first set of storage locations is allocated to the file, wherein the first extent type indicates that when an application requests to read the first byte range of the file, a file system should return all 0's as data for the first byte range;
wherein the program instructions are executable to cause the source computer system to replicate the file to the target computer system without transmitting 0's as data for the first byte range.

7. The non-transitory computer-accessible storage medium of claim 1,
wherein the first extent corresponds to a first byte range of the file for which storage device locations are not allocated, wherein the first extent type indicates that when an application requests to read the first byte range of the file, a file system should return all 0's as data for the first byte range;
wherein the program instructions are executable to cause the source computer system to replicate the file to the target computer system without transmitting 0's as data for the first byte range.

8. The non-transitory computer-accessible storage medium of claim 1,
wherein the first extent corresponds to a first byte range of the file and corresponds to a first set of storage locations of a storage device, wherein encoded data is stored in the first set of storage locations, wherein the first extent type indicates that when an application requests to read the first byte range of the file, a file system should decode the data and return the decoded data;
wherein the program instructions are executable to cause the source computer system to transmit the encoded data to the target computer system without decoding the data.

9. The non-transitory computer-accessible storage medium of claim 1,
wherein the respective transmission information corresponding to the compressed extent includes compressed data stored in the compressed extent, a length of the original data, and a length of the compressed data stored in the compressed extent.

10. The non-transitory computer-accessible storage medium of claim 1,
wherein the file is a first file, wherein the first extent type indicates that the first extent is a first shared extent referencing a first set of storage device locations which are also referenced by a second shared extent of a second file, wherein first data is stored in the first set of storage device locations;
wherein in replicating the file from the source computer system to the target computer system, the program instructions are executable to cause the source computer system to read the first data from the first set of storage locations and transmit the first data to the target computer system in the first transmission information;
wherein the program instructions are further executable by the source computer system to cause the source computer system to replicate the second file to the target computer system without re-transmitting the first data to the target computer system.

11. The non-transitory computer-accessible storage medium of claim 10,
wherein the first extent type further indicates that the first data stored in the first set of storage device locations is encoded data, wherein the program instructions are executable to cause the source computer system to transmit the first data to the target computer system without decoding the data.

12. The non-transitory computer-accessible storage medium of claim 1,
wherein the first extent corresponds to a first set of storage locations of a storage device, wherein first data is stored in the first set of storage locations, wherein the file also includes a second extent of the first extent type, wherein the second extent also corresponds to the first set of storage locations;
wherein in replicating the file from the source computer system to the target computer system, the program instructions are executable to cause the source computer system to read the first data from the first set of storage locations and transmit the first data to the target computer system in association with the first extent without re-transmitting the first data in association with the second extent.

13. A system comprising:
a source computer system, including one or more processors and memory, wherein the memory stores program instructions executable by the one or more processors to:
replicate a file to a target computer system, wherein the program instructions are executable to cause the one or more processors to perform at least the following operations in replicating the file:
receive extent information identifying extents of the file;
determine from the extent information that the file includes a first extent of a first extent type and one or more additional extents including a compressed extent, wherein the first extent type is one of a plurality of extent types and the one or more additional extents have a corresponding one or more additional extent types, wherein each of the one or more additional extent types is one of the plurality of extent types, and wherein the compressed extent includes data compressed by a file system of the source computer system in response to receiving original data from an application;
determine first transmission information corresponding to the first extent to transmit to the target computer system, wherein the first transmission information specifies the first extent type;
transmit the first transmission information to the target computer system, wherein the first transmission information enables the target computer system to replicate the first extent; and
for each of the one or more additional extents:
determine respective transmission information, corresponding to that additional extent, specifying the respective extent type of that additional extent, including specifying a compressed extent type for the compressed extent; and
transmit the respective transmission information to the target computer system, wherein the respective transmission information enables a file system of the target computer system to replicate the respective additional extent;
wherein the first transmission information and the respective transmission information for each of the one or more additional extents enable the target computer system to preserve an extent structure of the file, wherein the extent structure comprises a quantity of the extents and the respective extent type of the extents, including the first extent of the first extent type and the one or more additional extents having the corresponding one or more additional extent types.

14. The system of claim 13, wherein the respective transmission information corresponding to the compressed extent includes compressed data stored in the compressed extent, a length of the original data, and a length of the compressed data stored in the compressed extent.

15. The system of claim 13, further comprising:
a target computer system, including one or more processors and memory, wherein the memory of the target computer system stores additional program instructions executable by the one or more processors of the target computer system to:
create a copy of the file on the target computer system, wherein the additional program instructions are executable to cause the one or more processors of the target computer system to perform at least the following operations in creating the copy of the file:
receive the first transmission information corresponding to the first extent from the source computer system;
analyze the first transmission information to determine that the first transmission information specifies the first extent type; and
send a file system of the target computer system a request to create the first extent in the copy of the file, wherein the request to create the first extent specifies the first extent type.

16. The system of claim 15,
wherein the additional program instructions are executable to cause the one or more processors of the target computer system to create a respective new extent corresponding to each of the one or more additional extents, wherein the respective new extent is an extent of the same extent type as the additional extent to which the respective new extent corresponds.

17. A method comprising:
replicating a file from a source computer system to a target computer system, wherein said replicating includes:
receiving extent information identifying extents of the file;
determining from the extent information that the file includes a first extent of a first extent type and one or more additional extents including a compressed extent, wherein the first extent type is one of a plurality of extent types and the one or more additional extents have a corresponding one or more additional extent types, wherein each of the one or more additional extent types is one of the plurality of extent types, and wherein the compressed extent includes data compressed by a file system of the source computer system in response to receiving original data from an application;
determining first transmission information corresponding to the first extent to transmit to the target computer system, wherein the first transmission information specifies the first extent type;
transmitting the first transmission information to the target computer system, wherein the first transmission information enables the target computer system to replicate the first extent; and
for each of the one or more additional extents:
determining respective transmission information, corresponding to that additional extent, that specifies the respective extent type of that additional extent, including specifying a compressed extent type for the compressed extent; and transmitting the respective transmission information to the target computer system, wherein the respective transmission information enables a file system of the target computer system to replicate the respective additional extent;

wherein the first transmission information and the respective transmission information for each of the one or more additional extents enable the target computer system to preserve an extent structure of the file, wherein the extent structure comprises a quantity of the extents and the respective extent type of the extents, including the first extent of the first extent type and the one or more additional extents having the corresponding one or more additional extent types.

18. The method of claim 17, wherein the respective transmission information corresponding to the compressed extent includes compressed data stored in the compressed extent, a length of the original data, and a length of the compressed data stored in the compressed extent.

19. The method of claim 17, further comprising:

the target computer system creating a copy of the file on the target computer system, wherein said creating the copy of the file includes:

receiving the first transmission information corresponding to the first extent from the source computer system;

analyzing the first transmission information to determine that the first transmission information specifies the first extent type; and sending a file system of the target computer system a request to create the first extent in the copy of the file, wherein the request to create the first extent specifies the first extent type.

\* \* \* \* \*